US009350902B2

(12) United States Patent
Tai et al.

(10) Patent No.: US 9,350,902 B2
(45) Date of Patent: May 24, 2016

(54) SIGNAL PROCESSING DEVICE, IMAGE READING DEVICE, IMAGE FORMING APPARATUS, INFORMATION PROCESSING APPARATUS, AND NON-TRANSITORY COMPUTER READABLE MEDIUM

(71) Applicant: FUJI XEROX CO., LTD., Tokyo (JP)

(72) Inventors: Shinichi Tai, Yokohama (JP); Kazunori Sato, Yokohama (JP); Yujin Ishi, Yokohama (JP); Eiji Yoshiya, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/489,185

(22) Filed: Sep. 17, 2014

(65) Prior Publication Data
US 2015/0264213 A1    Sep. 17, 2015

(30) Foreign Application Priority Data

Mar. 17, 2014 (JP) ................ 2014-053196
Mar. 27, 2014 (JP) ................ 2014-065947
Mar. 27, 2014 (JP) ................ 2014-065948

(51) Int. Cl.
*H04N 1/04* (2006.01)
*H04N 1/60* (2006.01)
*H04N 1/40* (2006.01)
*H04N 1/10* (2006.01)

(52) U.S. Cl.
CPC ........... *H04N 1/6008* (2013.01); *H04N 1/1017* (2013.01); *H04N 1/40056* (2013.01)

(58) Field of Classification Search
None
See application file for complete search history.

(56) References Cited

U.S. PATENT DOCUMENTS

| 5,712,674 A * | 1/1998 | Doi ................. G03B 27/73 347/115 |
| 2004/0075858 A1 | 4/2004 | Namizuka |
| 2014/0313545 A1 * | 10/2014 | Hashimoto ........... G03G 21/14 358/1.15 |
| 2015/0244891 A1 * | 8/2015 | Togashi ............. H04N 1/02885 358/509 |

FOREIGN PATENT DOCUMENTS

| JP | A-2004-72215 | 3/2004 |
| JP | A-2006-304200 | 11/2006 |

* cited by examiner

*Primary Examiner* — Helen Q Zong
(74) *Attorney, Agent, or Firm* — Oliff PLC

(57) ABSTRACT

An image reading device includes: a reading unit in which light receiving elements are arranged in a line along a second direction; and a light source control section that controls emission of the light source members, the light source control section performing control such that light is emitted in a cycle order of the first, second, and third colors on the basis of a reference signal which is output at a preset time interval, and to make a time of emission of the light with the first color close to a time of start of emission of the light with the second color and to make a time of emission of the light with the third color close to a time of end of emission of the light with the second color.

24 Claims, 34 Drawing Sheets

```
R  100   0    0         R   20   80   0
G   0   100   0    →    G   0   100   0
B   0    0   100        B   0    80  20
```

FIG. 34A
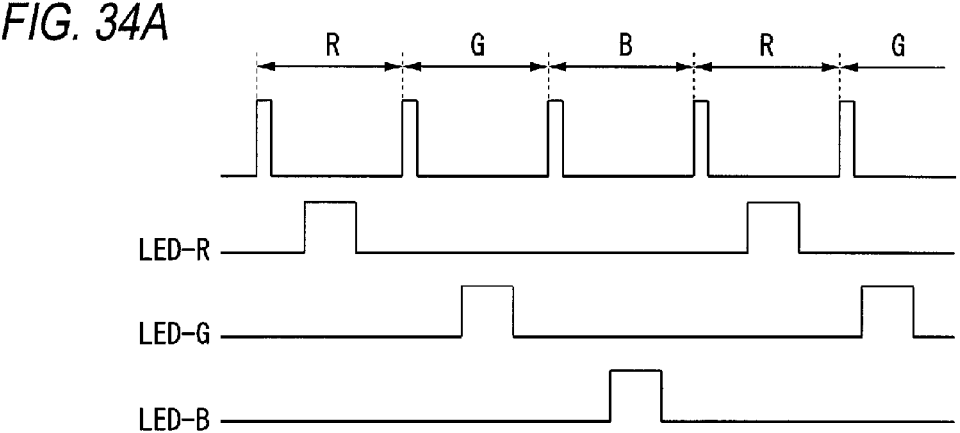
LED-R
LED-G
LED-B
FIG. 34B
BLACK
FIG. 34C
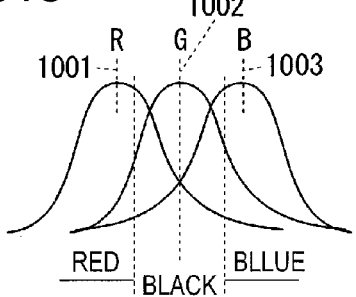
FIG. 34D
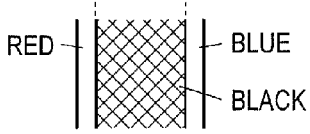
FIG. 34E
```
R   100   0     0
G   0     100   0
B   0     0     100
```
↓ CORRECTION (1)
```
R   34    66    0
G   0     100   0
B   0     66    34
```
FIG. 34F
```
R   100   0     0
G   0     100   0
B   0     0     100
```
↓ CORRECTION (2)
```
R   34    66    0
G   10    80    10
B   0     66    34
```

SIGNAL PROCESSING DEVICE, IMAGE READING DEVICE, IMAGE FORMING APPARATUS, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-053196 filed on Mar. 17, 2014, Japanese Patent Application No. 2014-065947 filed on Mar. 27, 2014, and Japanese Patent Application No. 2014-065948 filed on Mar. 27, 2014.

BACKGROUND

Technical Field

The present invention relates to a signal processing device, an image reading device, an image forming apparatus, an information processing apparatus, and a non-transitory computer readable medium.

SUMMARY

According to an aspect of the present invention, there is provided an image reading device including: a light source section that irradiates an original document, on which an image is printed, with light, the light source section including a first light source member which emits light with a first color, a second light source member which emits light with a second color different from the first color, and a third light source member which emits light with a third color different from the first and second colors; a reading section that reads the original document by moving in a preset first direction relative to the original document, the reading section having light receiving elements, which receive light reflected from the original document and are arranged to receive light along a second direction intersecting with the first direction; and a light source control section that controls emission of the light source members, the light source control section performing control such that light is emitted in a cycle order of the first, second, and third colors on the basis of a reference signal which is output at a preset time interval, and to make a time of emission of the light with the first color close to a time of start of emission of the light with the second color and to make a time of emission of the light with the third color close to a time of end of emission of the light with the second color.

BRIEF DESCRIPTION OF THE DRAWINGS

Exemplary embodiment(s) of the present invention will be described in detail based on the following figures, wherein

FIGS. 34A to 34F are explanatory diagrams of image reading in the related art, where FIG. 34A is a timing chart of light control in the related art, FIG. 34B is an image of black lines as an example of an original document image, FIG. 34C is an explanatory diagram of respective rays in a case of reading the original document of FIG. 34B, FIG. 34D is an explanatory diagram of the read image of the original document image of FIG. 34B, FIG. 34E is an explanatory diagram of a first example of an interpolation process in the related art, and FIG. 34F is an explanatory diagram of a second example of an interpolation process in the related art.

DETAILED DESCRIPTION

Comparative Example

Before examples of the embodiments for carrying out the present invention are described in detail, a comparative example for the examples of the embodiments for carrying out the present invention will be described first.

Figure 1:
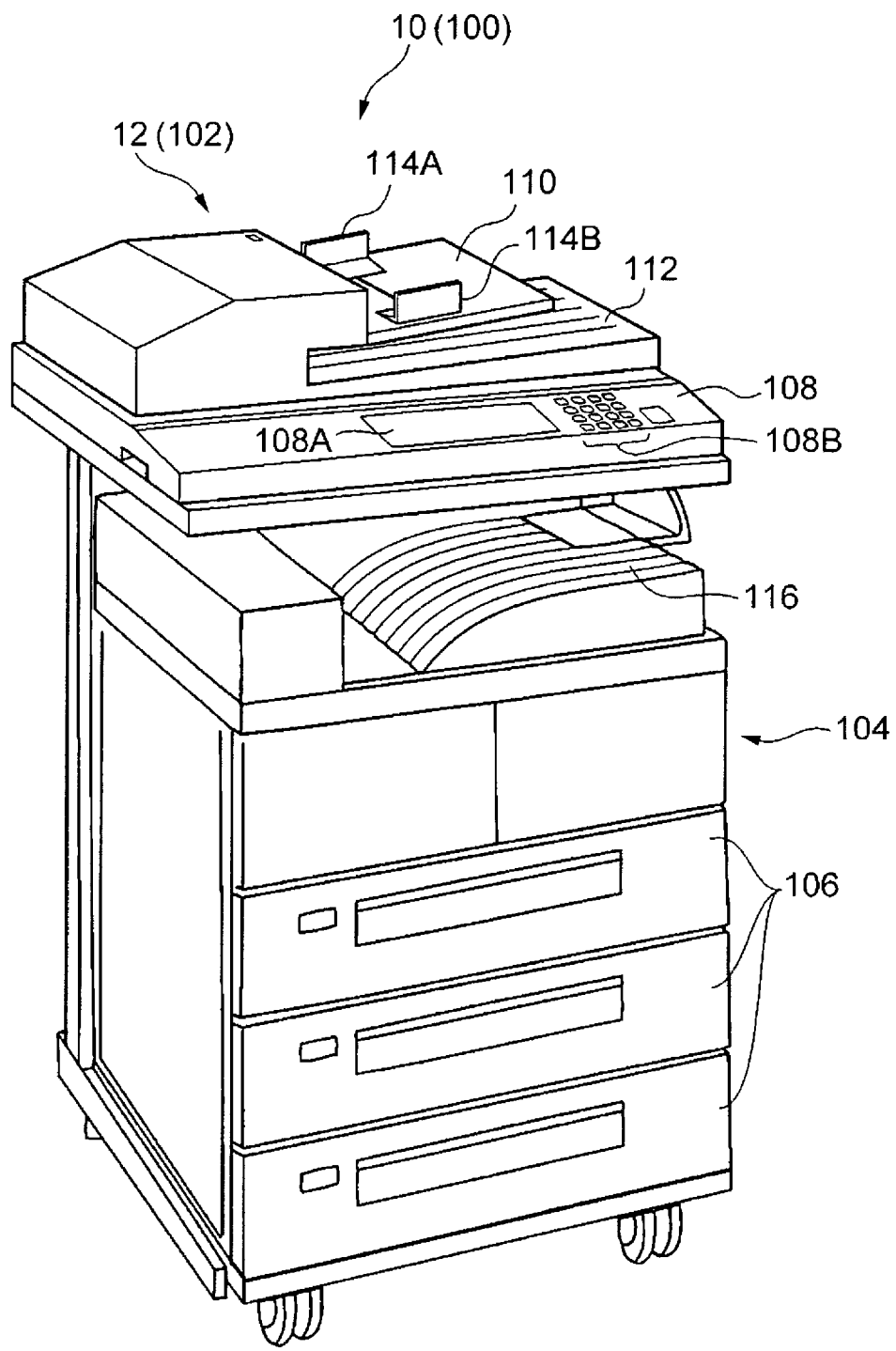
FIG. 1 is a perspective view illustrating an example of an appearance of an information processing apparatus according to a comparative example and first and second embodiments.

For example, as shown in FIG. 1, an information processing apparatus 100 includes an image reading section 102, an image forming section 104 (an example of an image forming apparatus according to the present invention), a paper accommodating section 106, and a user interface (UI) section 108.

The image reading section 102 includes an original document platen 110 and a discharge tray 112. A pair of guiding members 114A and 114B is provided on the upper surface of the original document platen 110. The pair of guiding members 114A and 114B guides the original document in a transport direction when one of the members is moved through a manual operation in a width direction of the original document placed on the original document platen 110 and the original document placed on the original document platen 110 is transported. The image reading section 102 takes sheets of the original document placed on the original document platen 110 one by one, reads images of the taken original document in a line-sequential way, and acquires image information that indicates the read images. Then, the acquired image information is output to a CPU 162 to be described later, and the original document is thereafter discharged to the discharge tray 112.

Here, "reading an image" means that a density of the image (hereinafter referred to as an "image density") is optically detected and an input/output circuit 200 to be described later outputs the image information to a control circuit 202 to be described later. That is to say, the image density indicates the concentration of the image. Further, the line-sequential way is a way of performing color separation by switching red, green, and blue light sources whenever a single line is read through a single reading operation by a line sensor (in the present example, a photoelectric conversion element 156 to be described later).

The paper accommodating section 106 contains sheets of paper, which is an example of a recording medium, separately in accordance with sizes, and the image forming section 104 draws a sheet of paper from the paper accommodating section 106, and forms an image on the sheet of paper. The image formed on the sheet of paper is defined as, for example, an image which is formed on the basis of the image information acquired from the image reading section 102 by a CPU 162 to be described later, an image which is formed on the basis of the image information acquired from an external device 176 to be described later by the CPU 162, or a reference image (so-called patch) for adjusting image quality. The image forming section 104 discharges the sheet of paper, on which the image is formed, to the discharge tray 116. In addition, the image forming method may be an electrophotographic method or may be an ink jet method.

The UI section 108 includes a touch panel display 108A, which displays an image, and a switch 108B. The touch panel display 108A and the switch 108B receive various instructions from a user of the information processing apparatus 100. Examples of the various instructions include an instruction (hereinafter, for convenience of description, referred to as a "scan start instruction") for causing the image reading section 102 to start image reading, and an instruction for causing the image forming section 104 to start image formation. The touch panel display 108A displays a result of a process, which is executed in response to the received instruction, or various kinds of information such as an alarm.

Figure 2:
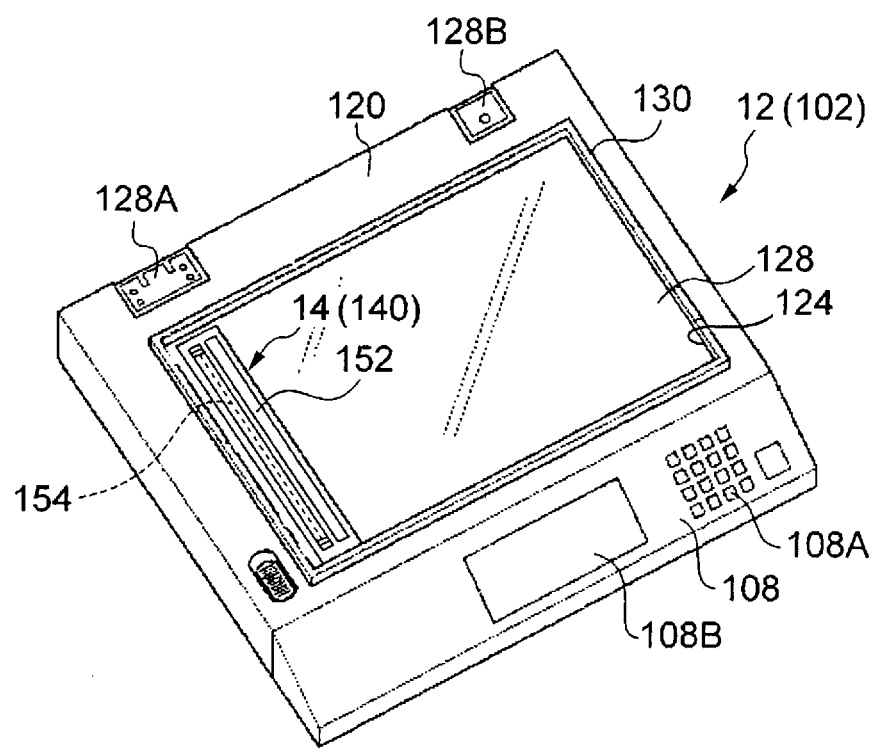
FIG. 2 is a perspective view illustrating an example of an appearance of a part of an image reading section included in an information processing apparatus according to the comparative example and the first and second embodiments.
Figure 3:
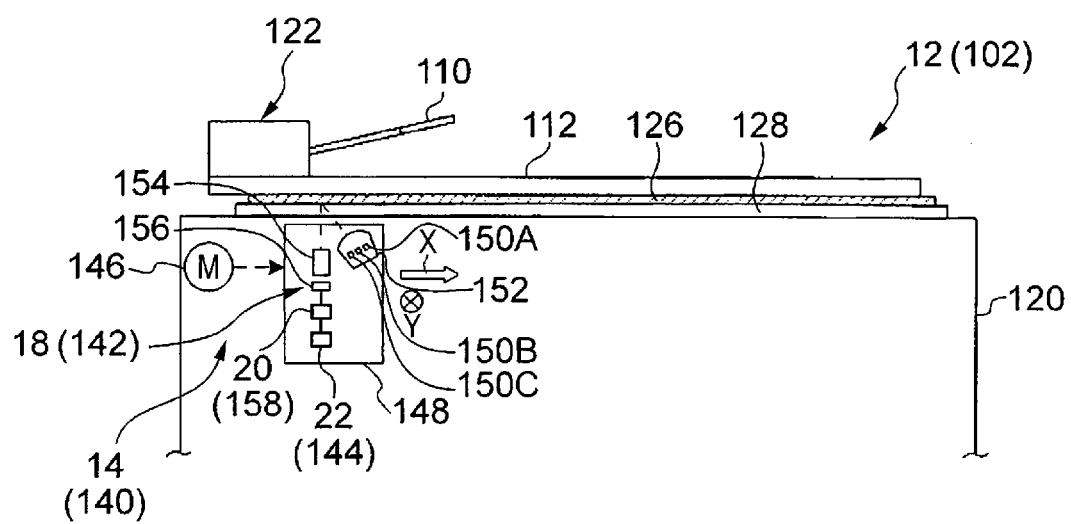
FIG. 3 is a schematic side view illustrating an example of a configuration of an image reading section included in the information processing apparatus according to the comparative example and the first and second embodiments.

For example, as shown in FIGS. 2 and 3, the image reading section 102 includes a housing 120 and an original document transport device 122. The original document transport device 122 includes an original document platen 110 and a discharge tray 112.

For example, as shown in FIG. 2, the housing 120 houses an image reading section main body 140, and a rectangular opening 124 (in the present example, an opening which is larger than an original document of the A3 size) is formed on the upper surface of the housing 120. The opening 124 is blocked by a platen glass 128 on which an original document 126 (refer to FIG. 3) is loaded. In the image reading section 102 according to the present example, a colorless transparent glass plate is applied as an example of the platen glass 128. However, the platen glass 128 is not limited to this, and may be an original document platen having transparency.

Fixing portions 128A and 128B are provided on the upper surface of the housing 120. Hinge members (not shown in the drawings), which are provided on the bottom surface of the original document transport device 122 (refer to FIG. 3), are fixed onto the fixing portions 128A and 128B, and the original document transport device 122 is opened or closed through the hinge members.

An original document setting guide 130, which is formed by a rectangular frame, is provided around the platen glass 128. The original document setting guide 130 has a protruded edge so as to have a shape slightly convex from the platen glass 128. Thus, the original document 126 is positioned by aligning the corners of the original document 126 such that the corners come into contact with the protruded edge of the original document setting guide 130. Alignment marks (not shown in the drawings) and original document size labels (not shown in the drawings) are provided on the upper surface of the original document setting guide 130. The alignment mark is a mark for aligning the corner of the original document 126 with the corner of the original document setting guide 130. The original document size label is a mark at which the end of the original document 126 is positioned by aligning the corner with the alignment mark when the original document 126 with a standard size (in the present example, B5, A4, B4, or A3) is loaded on the platen glass 128.

For example, in the original document transport device 122 shown in FIG. 3, the original document (a sheet of the original document on the top when there is a stack of a plurality of sheets) loaded on the original document platen 110 is transported to an original document reversing unit (not shown in the drawings), and passes through the reading region on the platen glass 128 while being reversed. Then, while the original document passes through the reading region, an image of the original document is read, and subsequently the original document is discharged to the discharge tray 112.

For example, as shown in FIG. 3, the image reading section main body 140 includes a contact image sensor (CIS) 142, and an image processing circuit 144, and a motor 146. The CIS 142 and the image processing circuit 144 are mounted on a carriage 148, and the carriage 148 is moved in a sub-scanning direction (an X direction shown in FIG. 3), which is a longitudinal direction of the opening 124, through driving force of the motor 146.

The CIS 142 includes a first light emitting diode (LED) 150A, a second LED 150B, and a third LED 150C. The first LED 150A is an LED having a wavelength of red (hereinafter referred to as R) light emission, the second LED 150B is an LED having a wavelength of green (hereinafter referred to as G) light emission, and the third LED 150C is an LED having a wavelength of blue (hereinafter referred to as B) light emission. The first LED 150A, the second LED 150B, and the third LED 150C are sequentially driven to emit light of each color of RGB in a predetermined order. Here, the predetermined order means a predetermined color order in which RGB is cyclic (for convenience of description, the order is hereinafter referred to as a "cyclic color order"). In addition, in the following description, for convenience of description, the first LED 150A, the second LED 150B, and the third LED 150C are referred to as an "LED 150" when it is not necessary for these to be separately described.

The CIS 142 has a light guiding member 152, a light condensing portion 154, a photoelectric conversion element 156 (an example of a generation section according to the present invention), and an analog front end (AFE) 158.

For example, as shown in FIG. 2, the light guiding member 152 is formed to extend along a main scanning direction (a Y direction shown in FIG. 3) which is a lateral direction of the opening 124. For example, as shown in FIG. 3, the LED 150 is mounted on one end of the light guiding member 152, and the light guiding member 152 guides light, which is emitted by the LED 150, onto the original document 126 through the platen glass 128.

The light condensing portion 154 is a lens unit in which a plurality of erecting equal-magnification imaging lens elements are arranged along the main scanning direction (refer to FIG. 2), and condenses light, which is reflected by the original document 126, when the LED 150 irradiates the original document 126 with light through the light guiding member 152.

A plurality of the photoelectric conversion elements 156 is arranged along the main scanning direction, and generates and outputs image information, which is an electrical signal corresponding to an amount of the received light, by receiving (imaging) the light (an example of the reflected light according to the present invention) condensed by the light condensing portion 154 and performing the photoelectric conversion. The image information, which is generated and output by the photoelectric conversion element 156, includes image information indicating an R image, image information indicating a G image, and image information indicating a B image.

In the following description, for convenience of description, the image information indicating the R image is referred to as "R image information", the image information indicating the G image is referred to as "G image information", and the image information indicating the B image is referred to as "B image information". Further, in the following description, for convenience of description, the R image information, the G image information, and the B image information are referred to as "image information" when it is not necessary for these to be separately described.

The AFE 158 adjusts the image information, which is input from the photoelectric conversion element 156, using an amplifier, an A/D converter, a filter, and the like (not shown in the drawings), and outputs the adjusted image information.

The image processing circuit 144 has a function of performing image processing such as shading correction and pixel arrangement conversion processing on the image information which is input from the AFE 158, as a function processing the image information, which is input from the AFE 158 in a cyclic color order from a specific color (here, R).

Figure 4:
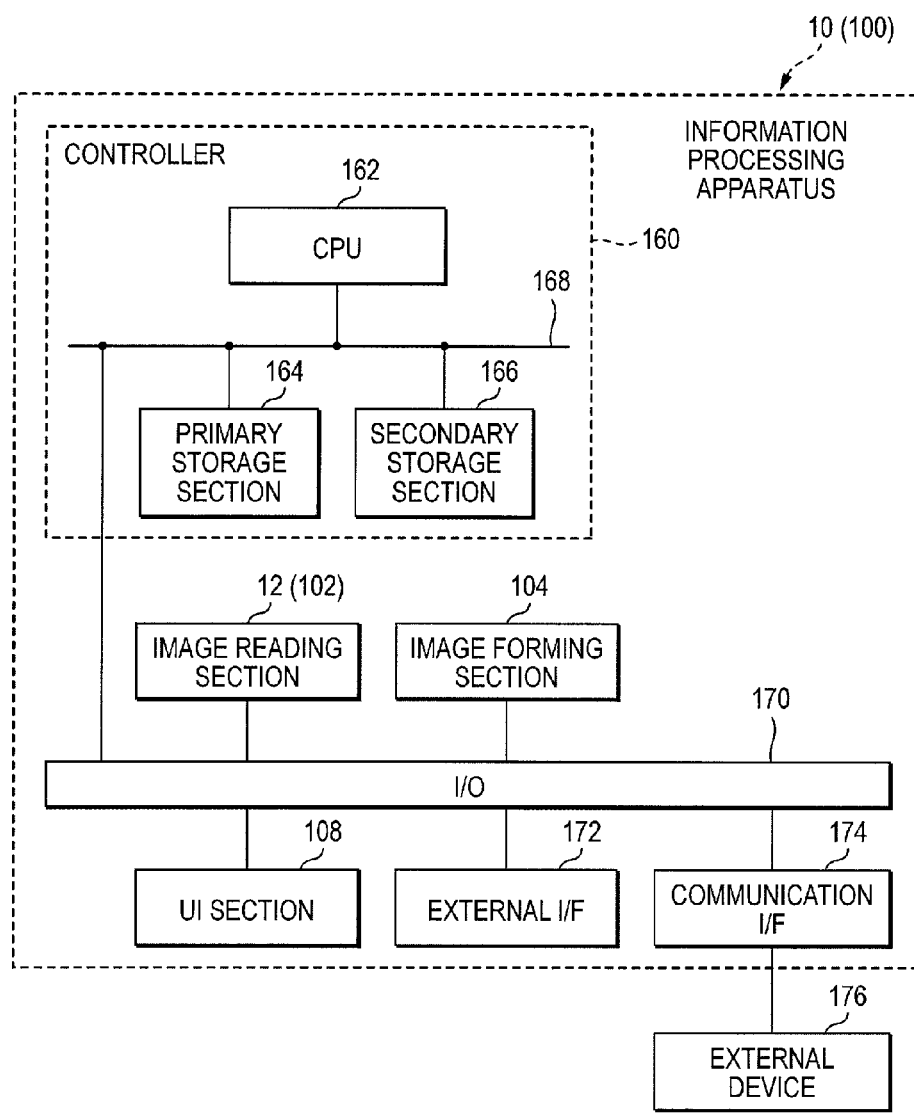
FIG. 4 is a block diagram illustrating an example of a hardware configuration of an electrical system of the information processing apparatus according to the comparative example and the first and second embodiments.

For example, as shown in FIG. 4, the information processing apparatus 100 includes a controller 160. The controller 160 includes a central processing unit (CPU) 162, a primary storage section 164, and a secondary storage section 166. The primary storage section 164 is a volatile memory (for example, a random access memory (RAM)) used as a work area when various programs are executed. The secondary storage section 166 is a nonvolatile memory (for example, a flash memory, a hard disk drive (HDD), or the like) that stores a control program, which controls an operation of the information processing apparatus 100, various parameters, and the like in advance. The CPU 162, the primary storage section 164, and the secondary storage section 166 are connected to each other through a bus 168.

The information processing apparatus 100 includes an input/output interface (I/O) 170 that electrically connects the CPU 162 and various input/output devices so as to transmit and receive various kinds of information between the CPU 162 and the various input/output devices. The information processing apparatus 100 includes the image reading section 102, the image forming section 104, and the UI section 108, as the input/output devices that are connected to the I/O 170 so as to be electrically connected to the CPU 162 through the bus 168. Further, the information processing apparatus 10 includes an external interface (I/F) 172 and a communication I/F 174 as the input/output devices.

The external I/F 172 is connected to an external device (for example, a USB memory) so as to transmit and receive various kinds of information between the external device and the CPU 162. The communication I/F 174 is connected to, for example, a communication unit such as a local area network (LAN) or the Internet so as to transmit and receive various kinds of information to and from an external device 176 (for example, a personal computer) connected to the communication unit.

The CPU 162 transmits and receives various kinds of information to and from the input/output device through the bus 168 and the I/O 170, so as to detect operation states of the input/output devices, control the input/output devices, and so on.

Figure 5:
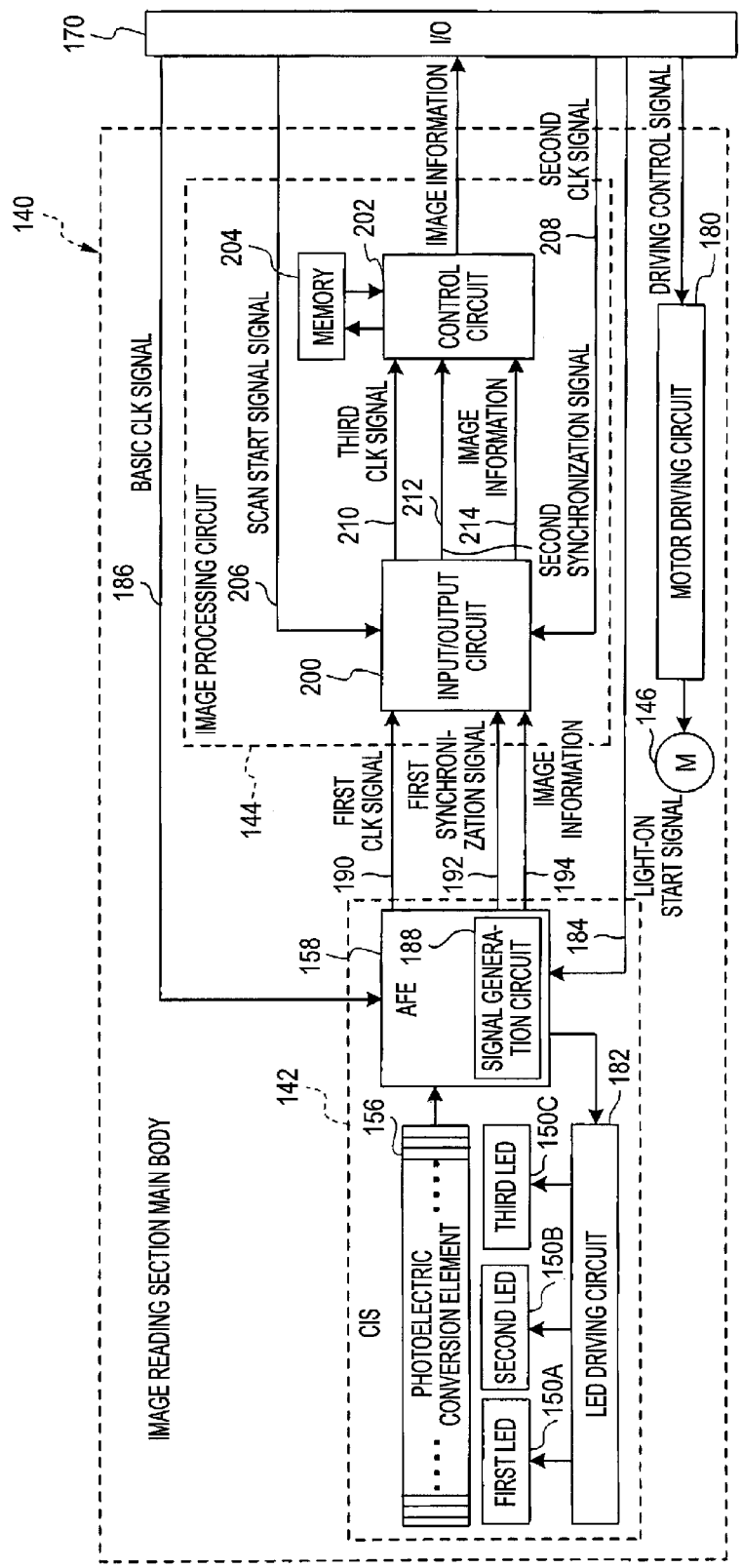
FIG. 5 is a block diagram illustrating an example of a hardware configuration of an electrical system of an image reading section main body of the image reading section included in the information processing apparatus according to the comparative example.

For example, as shown in FIG. 5, the image reading section main body 140 includes a motor driving circuit 180. The motor driving circuit 180 is connected to each of the motor 146 and the I/O 170 so as to control driving of the motor 146 in accordance with a driving control signal which is input from the CPU 162 through the I/O 170 in response to a scan start instruction received by the UI section 108.

The CIS 142 includes a LED driving circuit 182. The LED driving circuit 182 is connected to each of the first LED 150A, the second LED 150B, and the third LED 150C. The AFE 158 is connected to the LED driving circuit 182, and is connected to the I/O 170 through the signal line 184. The AFE 158 controls driving of the LED driving circuit 182 in accordance with a light-on start signal which is input through the I/O 170 and the signal line 184 from the CPU 162 in response to the scan start instruction received by the UI section 108. The LED driving circuit 182 causes the first LED 150A, the second LED 150B, and the third LED 150C to emit light repeatedly in order of the first LED 150A, the second LED 150B, and the third LED 150C, under the control of the AFE 158. That is, when the light-on start signal is input, the AFE 158 controls the LED driving circuit 182 such that the circuit causes the first LED 150A of the LED 150 to emit light first and thereafter causes the LED 150 to emit light in the cyclic color order from B.

The AFE 158 is connected to the photoelectric conversion element 156, and is connected to the I/O 170 through the signal line 186. The AFE 158 includes a signal generation circuit 188. The signal generation circuit 188 generates a first synchronization signal and a first clock signal (first CLK signal), on the basis of a basic clock signal (basic CLK signal) which is input through the I/O 170 and the signal line 186 from the CPU 162. It should be noted that the first synchronization signal is a single pulse (hereinafter simply referred to as a "pulse"). Here, the pulse means, for example, a single square-wave of which a signal level is shifted from the low level to the high level and is then shifted from the high level to the low level.

The image processing circuit 144 includes an input/output circuit 200, a control circuit 202, and a memory 204. It should be noted that, in the present example, a field programmable gate array (FPGA) is employed as an example of the input/output circuit 200. Further, in the present example, a CPU, on which an application specific integrated circuit (ASIC) is mounted, is employed as an example of the control circuit 202.

The input/output circuit 200 is connected to the AFE 158 through each of the signal lines 190, 192, and 194. The AFE 158 outputs the first CLK signal, which is generated by the signal generation circuit 188, to the input/output circuit 200 through the signal line 190, and outputs the first synchronization signal, which is generated by the signal generation circuit 188, to the input/output circuit 200 through the signal line 192 in accordance with the first CLK signal.

The AFE 158 applies processing corresponding to processing, which is performed by a general AFE, to each of the pieces of image information which is input from the photoelectric conversion element 156 in a cyclic color order (here, a cyclic color order from R). Then, the image information is output to the input/output circuit 200 through the signal line 194 in a cyclic color order (an order of input of the image information) in accordance with the output of the first synchronization signal. Here, the image information is output in accordance with the output of the first synchronization signal, in other words, this means that the image information (image information having free space) is output in synchronization with the output of the first synchronization signal.

Figure 25:
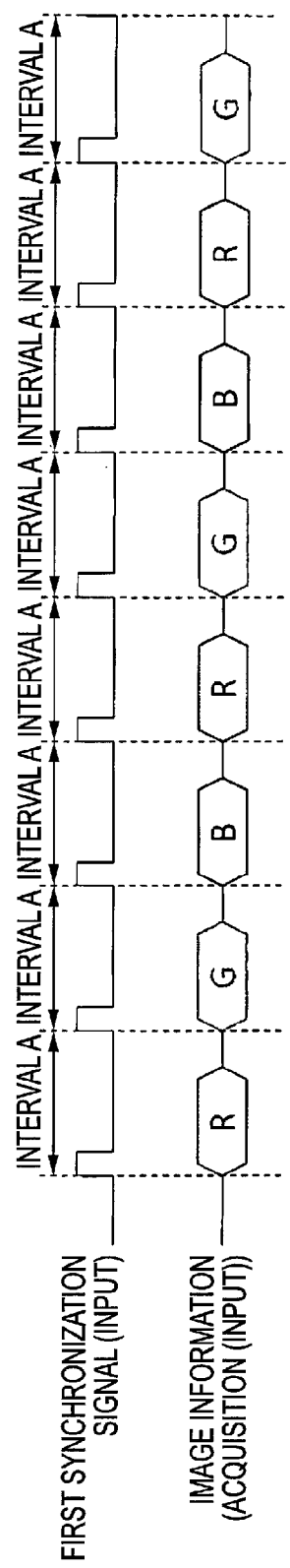
FIG. 25 is a timing chart illustrating an example (an exemplary case where an input interval of the first synchronization signal is constant) of the first synchronization signal and the image information which are input to the input/output circuit according to the comparative example and the first and second embodiments.

The input/output circuit 200 acquires corresponding image information in synchronization with the input of the first synchronization signal, where the first synchronization signal is input at a timing determined on the basis of the first CLK signal which is input from the AFE 158. It should be noted that the corresponding image information means image information which is output together with the first synchronization signal by the AFE 158. Further, in the present comparative example, for convenience of description, when the first synchronization signal is input to the input/output circuit 200, for example, as shown in FIG. 25, it is the premise that the first synchronization signal is input at an interval A.

The input/output circuit 200 is connected to the I/O 170 through each of signal lines 206 and 208, and is connected to the control circuit 202 through each of signal lines 210, 212, and 214. The control circuit 202 is connected to each of the memory 204 and the I/O 170.

The input/output circuit 200 generates a third clock signal (third CLK signal) used in the control circuit 202, in accordance with a second clock signal (second CLK signal) which is input through the I/O 170 and the signal line 208 from the CPU 162. Then, the generated third CLK signal is output to the control circuit 202 through the signal line 210.

When a scan start signal (an example of an instruction signal according to the present invention) is input through the I/O 170 and the signal line 206 from the CPU 162, the input/output circuit 200 generates a second synchronization signal, which is a pulse, in accordance with the second CLK signal whenever the first synchronization signal is input. Then, the generated second synchronization signal is output to the control circuit 202 through the signal line 210. Further, the input/output circuit 200 ends generation of the second synchronization signal when a scan end signal is input through the I/O 170 and the signal line 206 from the CPU 162. It should be noted that the instruction signal according to the present invention means a signal for instructing the input/output circuit 200 to output the acquired image information to a post-stage circuit (here, for example, the control circuit 202).

The input/output circuit 200 outputs the acquired image information to the control circuit 202 through the signal line 214 in an acquisition order (cyclic color order) in accordance with the output of the second synchronization signal. Here, the image information is output in accordance with the output of the second synchronization signal, in other words, this means that the image information is output in synchronization with the output of the second synchronization signal. It should be noted that the CPU 162 generates and outputs the scan start signal on a page basis in response to the scan start instruction which is received by the UI section 108.

The control circuit 202 acquires the image information, which is input from the input/output circuit 200, in accordance with the second synchronization signal, and temporarily stores the acquired image information in the memory 202. The control circuit 202 acquires the image information from the memory 204 at a timing determined on the basis of the third CLK signal which is input from the input/output circuit 200. Then, after the acquired image information is subjected to predetermined processing (such as shading correction), the image information is output to a predetermined output destination (for example, the CPU 162) through the I/O 170.

When the scan start signal is input to the input/output circuit 200, the control circuit 202 first identifies R as a color (in other words, a color of an image indicated by the image information) corresponding to the image information acquired in synchronization with the input of the second synchronization signal. Subsequently, until the scan end signal is input to the input/output circuit 200, the control circuit 202 identifies a color, which corresponds to the image information acquired in synchronization with the input of the second synchronization signal, whenever the second synchronization signal is input in a cyclic color order from a color (here, B) subsequent to R. That is, in other words, after the scan start signal is input to the input/output circuit 200, the control circuit 202 identifies RGB, which are colors corresponding to the image information acquired from the input/output circuit 200, in a cyclic color order from R.

The control circuit 202 performs image processing on the image information acquired on the premise that the input/output circuit 200 outputs the R image information first after the scan start signal is input to the input/output circuit 200.

Figure 6:
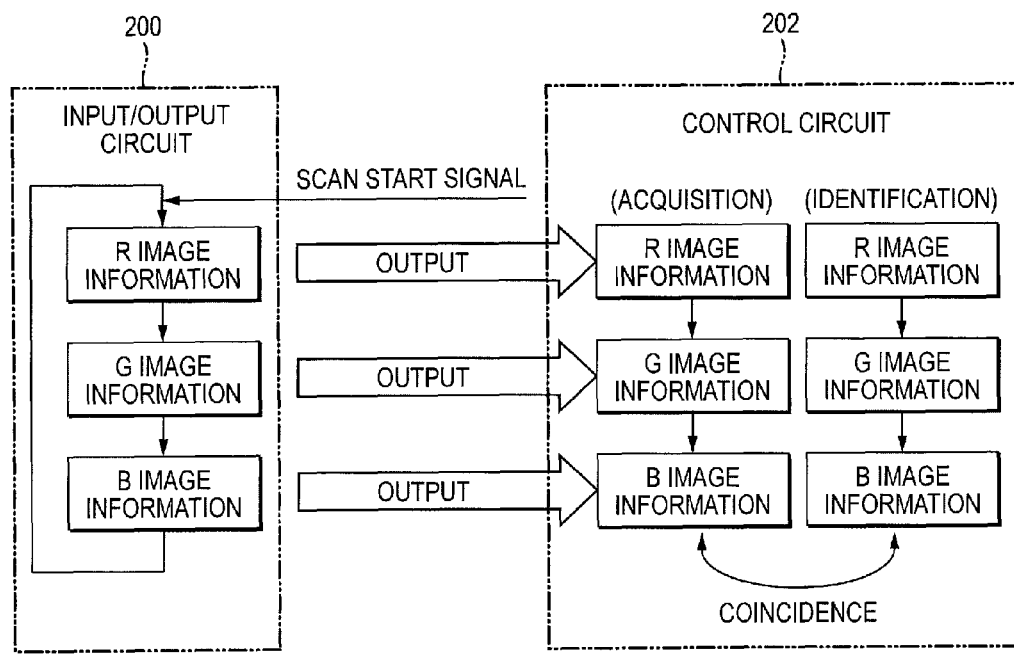
FIG. 6 is a conceptual diagram illustrating an example of cyclic color orders of image information pieces respectively acquired by an input/output circuit and a control circuit and color cycle sequences identified by the control circuit, in the comparative example.

Hence, for example, as shown in FIG. 6, after the input/output circuit 200 acquires the B image information, before the circuit acquires the R image information, when the scan start signal is input to the input/output circuit 200, in the control circuit 202, the image information is acquired in a cyclic color order starting from R. In this case, in the control circuit 202, the image information is identified in the cyclic color order starting from R, thereby performing the image processing. That is, in the control circuit 202, the identified cyclic color order coincides with the cyclic color order of the colors corresponding to the actually acquired image information.

In the following description, for convenience of description, the cyclic color order of the colors corresponding to the image information actually acquired by the control circuit 202 is referred to as an "acquired cyclic color order", and the cyclic color order identified by the control circuit 202 is referred to as an "identified cyclic color order".

Figure 7:
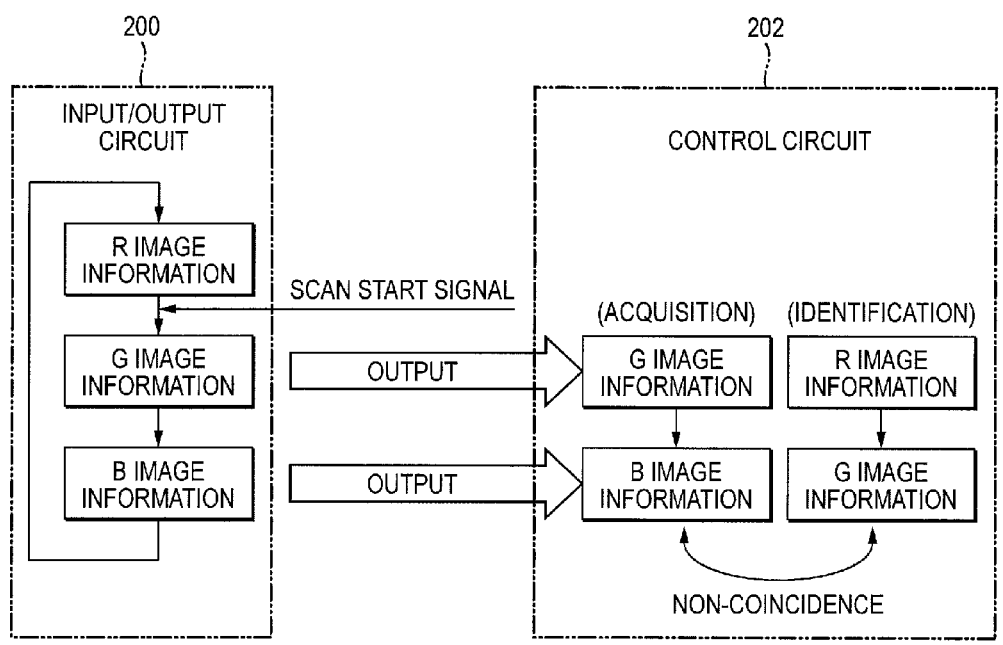
FIG. 7 is a conceptual diagram illustrating another example of cyclic color orders of image information pieces respectively acquired by the input/output circuit and the control circuit and a cyclic color order identified by the control circuit, in the comparative example.

Meanwhile, for example, as shown in FIG. 7, after the input/output circuit 200 acquires the R image information, before the circuit acquires the G image information, when the scan start signal is input to the input/output circuit 200, in the control circuit 202, the image information is acquired in a cyclic color order starting from G. However, in the control circuit 202, the image information is identified in the cyclic color order starting from R, thereby performing the image processing. That is, in the control circuit 202, the identified cyclic color order does not coincide with the acquired cyclic color order. Accordingly, regardless of whether the image information is acquired in the cyclic color order starting from G actually, the image information is acquired in the cyclic color order starting from R, thereby performing the image processing. Hence, the image indicated by the image information, which is output by the control circuit 202, is an image in which the colors are deviated.

Figure 8:
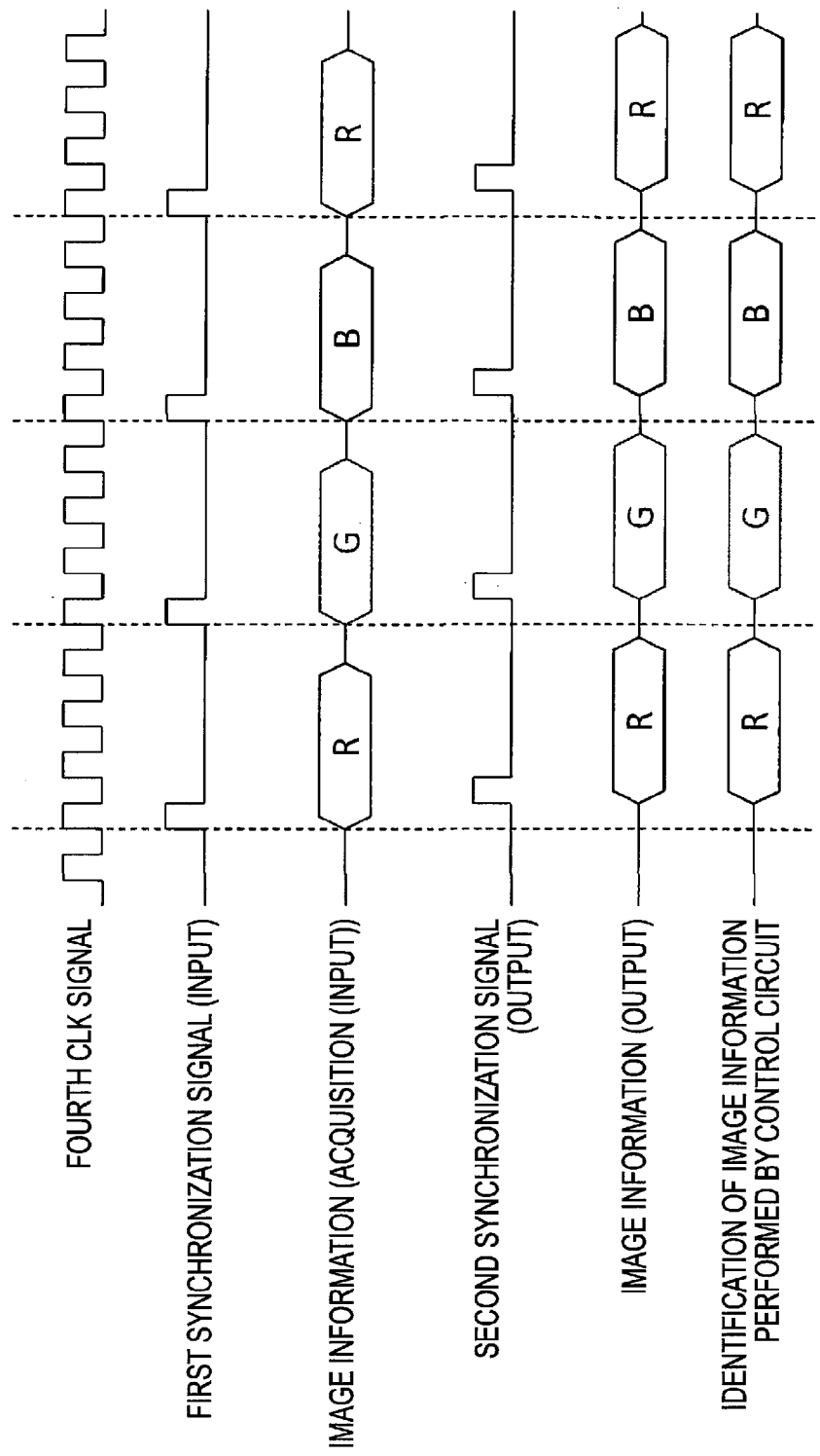
FIG. 8 is a timing chart illustrating an example of signals (a first synchronization signal and image information) which are input to the input/output circuit, a fourth CLK signal which is generated and output from the inside of the input/output circuit, signals (a second synchronization signal and image information) which are output by the input/output circuit, and a cyclic color order identified by the control circuit, in the comparative example.

In the input/output circuit 200, a fourth CLK signal, which is a clock signal determined on the basis of the first CLK signal, is generated. The fourth CLK signal means a clock signal that defines a time of inputting the first synchronization signal, which is output by the AFE 158, to the input/output circuit 200. In the input/output circuit 200, when the scan start signal is input, for example, as shown in FIG. 8, the first synchronization signal is input in accordance with the fourth CLK signal. The input/output circuit 200 acquires the image information in the cyclic color order in synchronization with the input of the first synchronization signal. Further, the second synchronization signal is generated, and is output to the control circuit 202 in response to the input of the first synchronization signal, and the image information is output to the control circuit 202 in the acquisition order (cyclic color order) in accordance with the output of the second synchronization signal. In this case, the control circuit 202 identifies the image information, which is acquired from the input/output circuit 200, in the cyclic color order starting from R in the acquisition order. Hence, the cyclic color order (hereinafter referred to as an "output cyclic color order") of the image information which is output by the input/output circuit 200, the acquired cyclic color order, and the identified cyclic color order coincide with one another.

Figure 9:
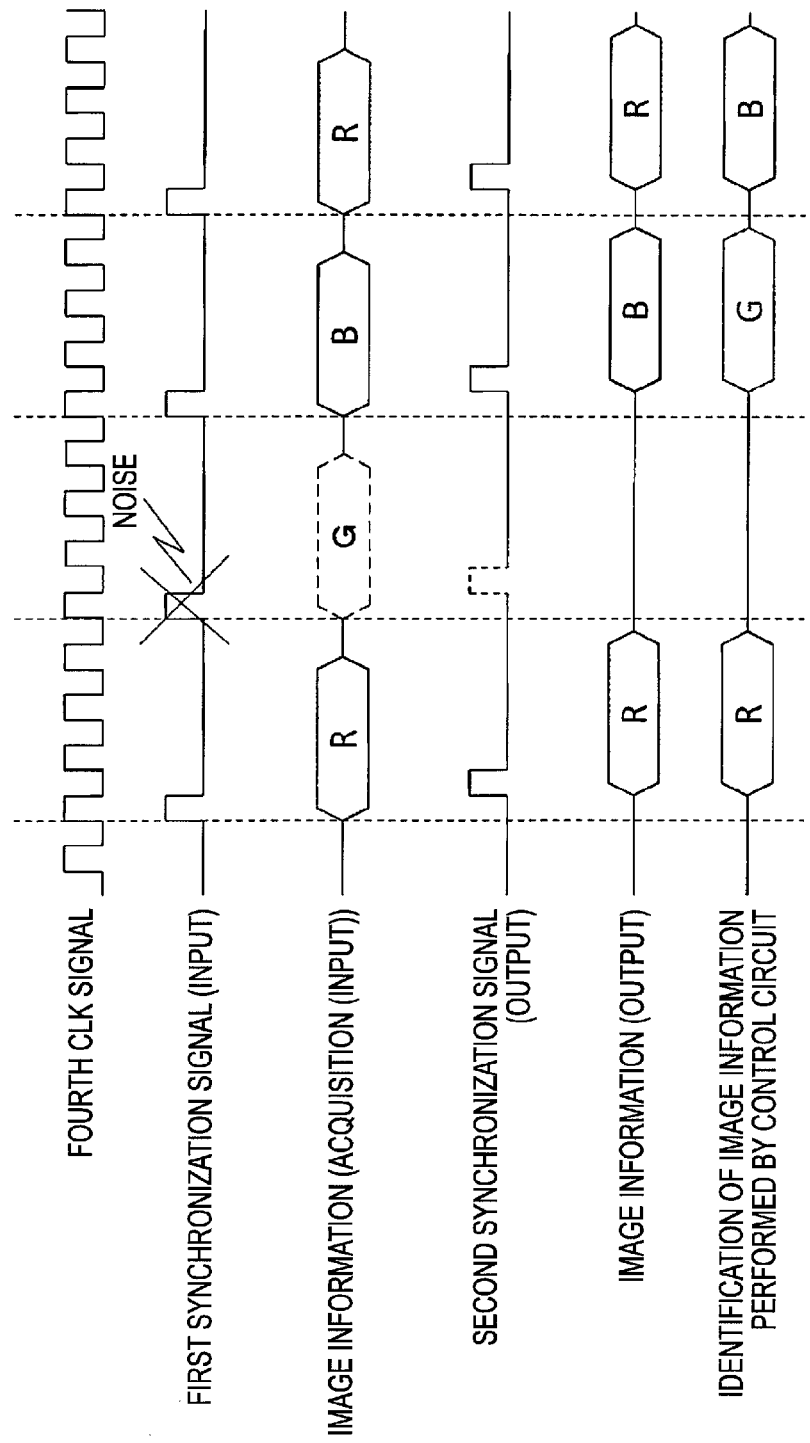
FIG. 9 is a timing chart illustrating an example (an exemplary case where noise interferes with an input of the first synchronization signal) of the signals which are input to the input/output circuit, the fourth CLK signal which is generated and output from the inside of the input/output circuit, the signals which are output by the input/output circuit, and the cyclic color order identified by the control circuit, in the comparative example.

However, for example, as shown in FIG. 9, in the input/output circuit 200, when the first synchronization signal corresponding to the G image information is not input due to the effect of noise (when the noise interferes with the input of the first synchronization signal), the G image information is not acquired. Further, the second synchronization signal is generated in response to the input of the first synchronization signal. Therefore, the second synchronization signal is not generated, and the G image information is not output to the control circuit 202. In this case, the control circuit 202 identifies the image information, which is input from the input/output circuit 200, in the cyclic color order starting from R in the input order. Therefore, the output cyclic color order coincides with the acquired cyclic color order. However, the output cyclic color order (acquired cyclic color order) does not coincide with the identified cyclic color order.

That is, in an example shown in FIG. 9, the input/output circuit 200 outputs the image information in an order of the R image information, the B image information, and the R image information. However, the control circuit 202 identifies that the image information is input in an order of the R image information, the G image information, and the B image information. When the control circuit 202 erroneously identifies the cyclic color order in such a manner, the image processing to be performed on the B image information is performed on the G image information, and the image processing to be performed on the R image information is performed on the B image information. Hence, the image indicated by the image information, which is output by the control circuit 202, is an image in which the colors are deviated.

Figure 10:
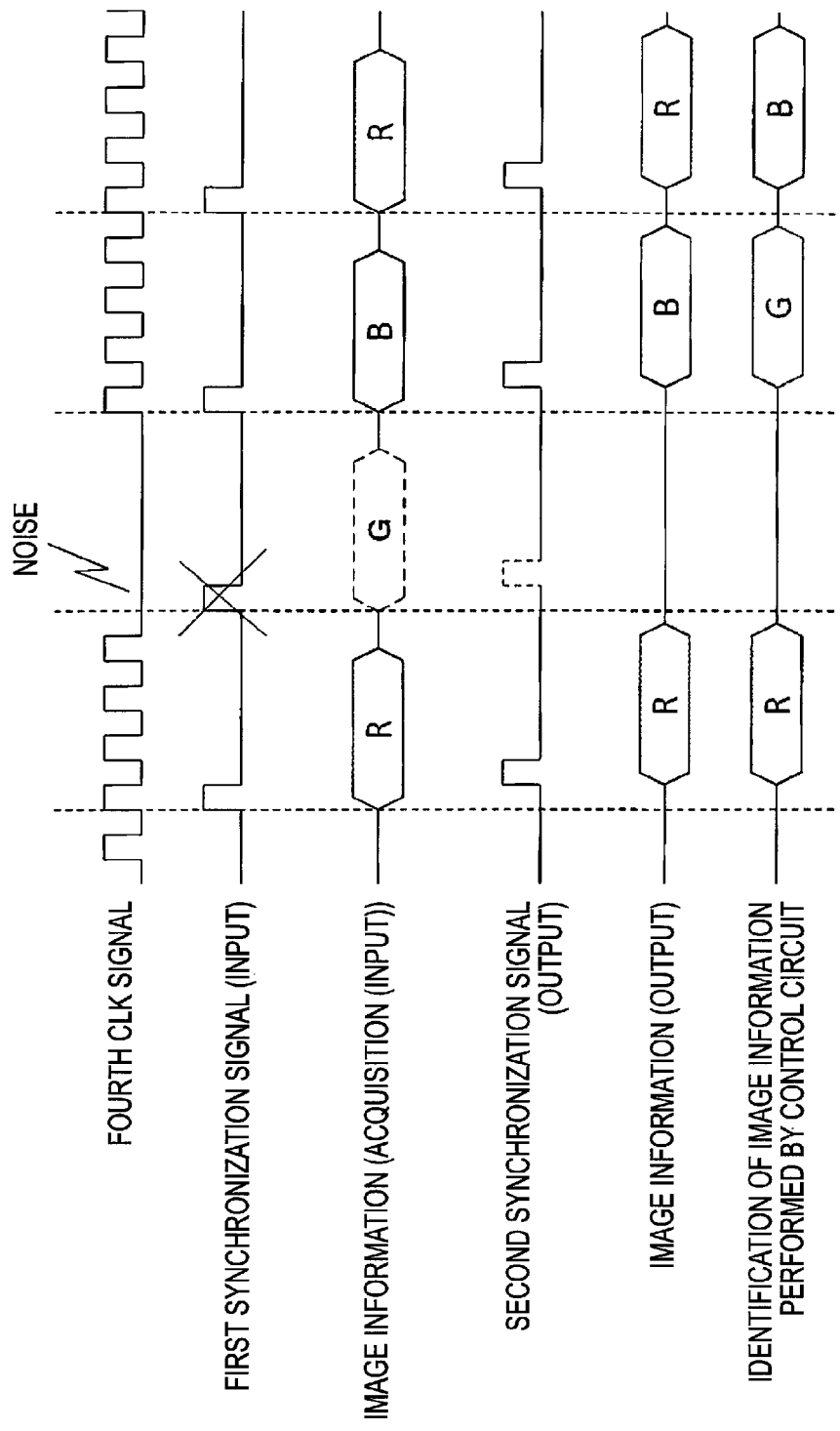
FIG. 10 is a timing chart illustrating an example (an exemplary case where noise interferes with an output of the fourth CLK signal) of the signals which are input to the input/output circuit, the fourth CLK signal which is generated and output from the inside of the input/output circuit, the signals which are output by the input/output circuit, and the cyclic color order identified by the control circuit, in the comparative example.

Further, for example, as shown in FIG. 10, when the output of the fourth CLK signal is stopped due to the effect of noise (the noise interferes with the output of the fourth CLK signal), the input/output circuit 200 does not acquire the G image information even when the first synchronization signal corresponding to the G image information is not input. Accordingly, the output cyclic color order coincides with the acquired cyclic color order. However, the output cyclic color order (acquired cyclic color order) does not coincide with the identified cyclic color order.

First Embodiment

Next, an example of an embodiment according to the present invention will be described in detail. It should be noted that, in the following description, the same elements as the elements described in the comparative example will be represented by the same reference numerals and signs, and a description thereof will be omitted. Further, in the following description, differences between the present embodiment and the comparative example will be described.

For example, as shown in FIGS. 1 to 4, an information processing apparatus 10 according to the present first embodiment is different from the information processing apparatus 100 in that an image reading section 12 is provided instead of the image reading section 102. For example, as shown in FIGS. 2 and 3, the image reading section 12, which is an example of an image reading device according to the present invention, is different from the image reading section 102 in that an image reading section main body 14 is provided instead of the image reading section main body 140.

Figure 11:
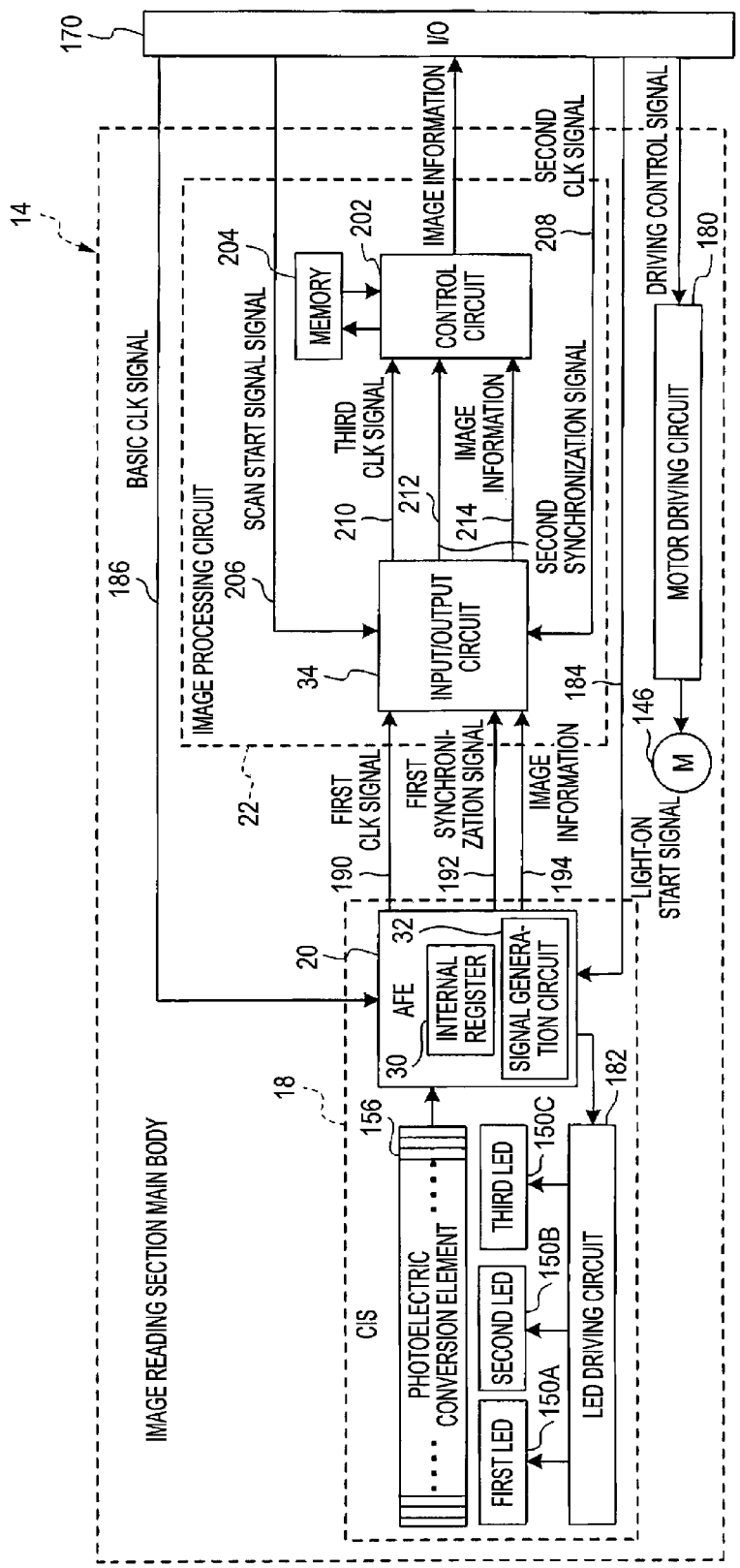
FIG. 11 is a block diagram illustrating an example of a hardware configuration of an electrical system of an image reading section main body of the image reading section included in the information processing apparatus according to the first and second embodiments.

For example, as shown in FIG. 3 and as shown in FIG. 11, the image reading section main body 14, which is an example of a signal processing device according to the present invention, is different from the image reading section main body 140 in the following points. A CIS 18 is provided instead of the CIS 142, and an image processing circuit 22 is provided instead of the image processing circuit 144. For example, as shown in FIG. 11, the CIS 18 is different from the CIS 142 in that an AFE 20 is provided instead of the AFE 158. The AFE 20 is an example of an output section according to the present invention. For example, as shown in FIG. 11, the image processing circuit 22 is different from the image processing circuit 144 in that an input/output circuit 34 is provided instead of the input/output circuit 200. The input/output circuit 34 is an example of an input/output section according to the present invention. In addition, in the following description, for convenience of description, when the first synchronization signal is input to the input/output circuit 34, for example, as shown in FIG. 25, it is the premise that the first synchronization signal is input at the interval A.

The AFE 20 outputs the image information together with the first synchronization signals having the forms corresponding to colors, in the cyclic color order. For example, as shown in FIG. 11, the AFE 20 is different from the AFE 158 in that an internal register 30 is provided and a signal generation circuit 32 is provided instead of the signal generation circuit 188. The internal register 30 stores duration information which indicates a duration (for example, a pulse width) of a pulse of the first synchronization signal corresponding to the R image information. The duration, which is indicated by the duration information, means, for example, a duration which is specified by a predetermined clock number based on the fourth CLK signal.

The signal generation circuit 32 is different from the signal generation circuit 188 in the following point. As the first synchronization signal corresponding to the R image information, a first synchronization signal (an example of a specific synchronization signal according to the present invention), which is a pulse of the duration indicated by the duration information stored in the internal register 30, is generated and output. It should be noted that the specific synchronization signal according to the present invention means a synchronization signal having a form corresponding to a specific color (here, for example, R) among the first synchronization signals.

The input/output circuit 34 acquires the corresponding image information in synchronization with the input of the first synchronization signal which is output by the AFE 20. Then, the acquired image information is output to the control circuit 202 in the cyclic color order from the image information corresponding to the specific synchronization signal.

Further, the input/output circuit 34 outputs the acquired image information to the control circuit 202 (an example of a post-stage circuit according to the present invention) in the acquisition order, together with the second synchronization signal which is generated in response to the input of the first synchronization signal. Furthermore, the input/output circuit 34 outputs a substitute synchronization signal, which substitutes for the second synchronization signal, to the control circuit 202 in a case where the first synchronization signal is not input. The case where the first synchronization signal is not input, in other words, means a case where noise interferes with the input of the first synchronization signal. That is, in the above description, "the case where the first synchronization signal is not input" does not mean a time in which the first synchronization signal is originally not input (for example, a time period in which the signal level between one pulse and another pulse adjacent at the interval A shown in FIG. 25 is a low level).

Figure 12:
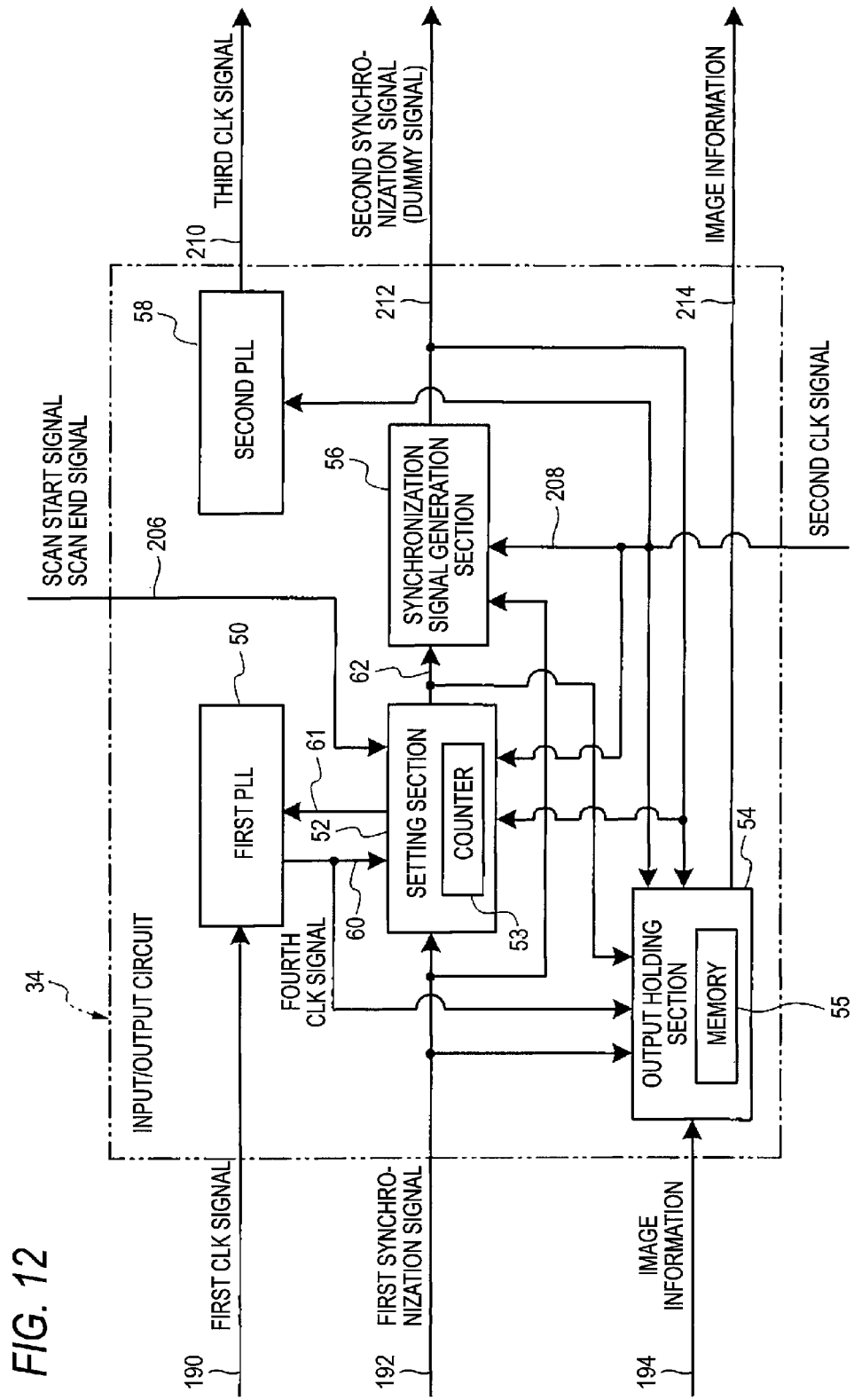
FIG. 12 is a block diagram illustrating an example of principal functions of the input/output circuit included in the image reading section main body shown in FIG. 11.

For example, as shown in FIG. 12, the input/output circuit 34 includes a first phase locked loop (PLL: phase synchronization circuit) 50, a setting section 52, an output holding section 54, a synchronization signal generation section 56, and a second PLL 58. The setting section 52 includes a counter 53, and the output holding section 54 includes a memory 55.

The first PLL 50, which is an example of a clock output section according to the present invention, is connected to the signal line 190, and is connected to the setting section 52 through each of the signal lines 60 and 61. The setting section 52 is connected to the signal lines 192, 206, 208, and 212, and is connected to the synchronization signal generation section 56 through the signal line 62. The output holding section 54 is connected to each of the signal lines 60, 62, 192, 194, 208, 212, and 214. The synchronization signal generation section 56 is connected to the signal lines 192 and 208. The second PLL 58 is connected to the signal lines 208 and 210.

The first PLL 50 generates the fourth CLK signal (an example of the input clock signal according to the present invention) with reference to the first CLK signal which is input through the signal line 190. Then, the generated fourth CLK signal is output to the setting section 52 and the output holding section 54 through the signal line 60. In the present first embodiment, as an example of the fourth CLK signal, a clock signal, of which the frequency of the first CLK signal is N times (here, for example, three times) the frequency of the first CLK signal, is employed.

Further, the first PLL 50 performs resetting when a reset operation signal is input from the setting section 52 through the signal line 61 under a stopped state. Furthermore, the first PLL 50 releases the reset state when a reset release signal is input from the setting section 52 through the signal line 61. Here, the stopped state means, for example, a state where the generation of the fourth CLK signal is stopped since the effect of noise is exerted on the first PLL 50. Further, the reset means that the fourth CLK signal is generated again and waiting for the input of the reset release signal is performed without the output of the generated fourth CLK signal. The reset release means that the fourth CLK signal is output again.

The setting section 52 detects edges (a rising edge and a trailing edge) of the pulse which is the first synchronization signal. The counter 53 counts an elapsed time (here, for example, the clock number of the fourth CLK signal) from a time point, at which the rising edge is detected, to a time point at which the trailing edge is detected. Further, the counter 53 counts an elapsed time (here, for example, the clock number of the second CLK signal (an example of the output clock signal according to the present invention)) from a time point at which the first synchronization signal (for example, the trailing edge of the pulse) is detected. Further, the counter 53 counts the number of outputs of a dummy signal to be described later.

The setting section 52 sets various flags, on the basis of the count value obtained by the counter 53. Here, the flag setting means that a flag is turned on or off. The various flags mean an R identification flag, a G identification flag, a B identification flag, an output permission flag, and a dummy output flag. The R identification flag, the G identification flag, and the B identification flag are set in an internal register (not shown in the drawings) of the setting section 52. The output permission flag is set for the output holding section 54 and the synchronization signal generation section 56. The dummy output flag is set for the synchronization signal generation section 56.

The R identification flag is a flag for identifying that the acquired image information is the R image information. The G identification flag is a flag for identifying that the acquired image information is the G image information. The B identification flag is a flag for identifying that the acquired image information is the B image information. The output permission flag is a flag for giving permission to output the image information to the control circuit 202. The dummy output flag is a flag for giving permission to output the dummy signal which is an example of the substitute synchronization signal substituting for the second synchronization signal. In addition, in the following description, for convenience of description, the R identification flag, the G identification flag, and the B identification flag are referred to as color identification flags when it is not necessary for these to be separately described.

The output holding section 54 acquires the corresponding image information and holds the information in the memory 55, in synchronization with the input of the first synchronization signal performed through the signal line 192 at a timing determined on the basis of the fourth CLK signal which is input through the signal line 60. Then, in a condition where the output permission flag is turned on, the image information output is performed. Here, the image information output means that the held image information is output to the control circuit 202 through the signal line 214 in synchronization with the input of the second synchronization signal performed through the signal line 212 at a timing determined on the basis of the second CLK signal which is input through the signal line 208.

The synchronization signal generation section 56 performs a synchronization signal output in a condition where the output permission flag is turned on. Here, the synchronization signal output means that the second synchronization signal as a pulse is generated and output in response to the input of the first synchronization signal performed through the signal line 192. In addition, the second synchronization signal is generated and output at the timing determined on the basis of the second CLK signal which is input through the signal line 208.

The synchronization signal generation section 56 performs a dummy signal output in a condition where the dummy output flag is turned on. The dummy signal output means that the dummy signal, which is a pulse substituting for the second synchronization signal, is generated and output in accordance with the second CLK signal which is input through the signal line 208. The output interval of the dummy signal is, for example, a predetermined interval (hereinafter, for convenience of description, referred to as a "first synchronization signal output interval") corresponding to the output interval of the first synchronization signal. The first synchronization signal output interval means, for example, a time interval from the rising edge of one first synchronization signal to the rising edge of another first synchronization signal among the output first synchronization signals which are adjacent.

The present first embodiment showed the exemplary case where the dummy signal is generated and output in accordance with the second CLK signal which is generated and output by the CPU 162 as a generation output source different from the first PLL 50. However, the present invention is not limited to this. That is, the dummy signal may be generated and output in accordance with the clock signal. The clock signal is generated and output by oscillators as a generation output source other than the CPU 162 and the generation output source (here, the first PLL 50) which generates and outputs the fourth CLK signal.

The second PLL 58 receives the input of the second CLK signal through the signal line 208, generates the third CLK signal with reference to the input second CLK signal, and outputs the generated third CLK signal to the control circuit 202 through the signal line 210.

Next, the effect of the present first embodiment will be described. First, a flag setting process executed by the setting section 52 will be described with reference to FIG. 13.

Figure 13:
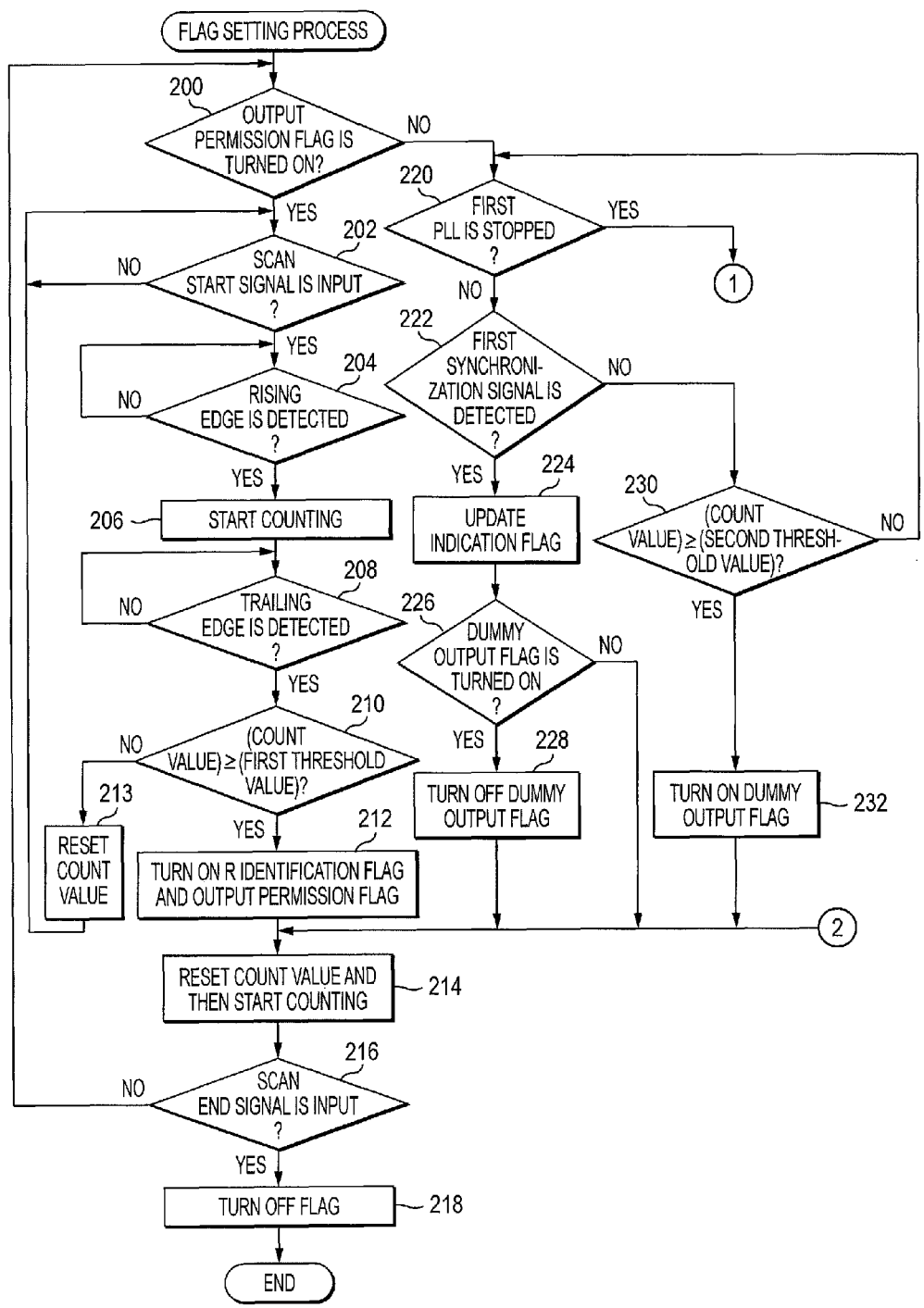
FIG. 13 is a flowchart illustrating an example of a flow of a flag setting process according to the first embodiment.

In the flag setting process shown in FIG. 13, first, in step 200, the setting section 52 determines whether or not the output permission flag is turned off in the output holding section 54 and the synchronization signal generation section 56. In step 200, if the output permission flag is turned off in the output holding section 54 and the synchronization signal generation section 56, the determination is positive, and the procedure advances to step 202. In step 200, if the output permission flag is not turned off (turned on) in the output holding section 54 and synchronization signal generation section 56, the determination is negative, and the procedure advances to step 220.

In step 202, the setting section 52 determines whether or not the scan start signal is input. In step 202, if the scan start signal is input, the determination is positive, and the procedure advances to step 204. In step 202, if the scan start signal is not input, the determination is negative, and the determination of step 202 is performed again.

In step 204, the setting section 52 determines whether or not the rising edge of the first synchronization signal is detected. In step 204, if the rising edge of the first synchronization signal is detected, the determination is positive, and the procedure advances to step 206. In step 204, if the rising edge of the first synchronization signal is not detected, the determination is negative, and the determination of step 204 is performed again.

In step 206, the counter 53 starts counting the clock number of the fourth CLK signal, and thereafter the procedure advances to step 208.

In step 208, the setting section 52 determines whether or not the trailing edge of the first synchronization signal is detected. In step 208, if the trailing edge of the first synchronization signal is detected, the determination is positive, and the procedure advances to step 210. In step 208, if the trailing edge of the first synchronization signal is not detected, the determination is negative, and the determination of step 208 is performed again.

In step 210, the setting section 52 determines whether or not the count value of the counter 53 starting the counting in step 206 is equal to or greater than a first threshold value. Here, the first threshold value means a clock number corresponding to the duration which is indicated by the duration information stored in the internal register 30. In step 210, if the count value of the counter 53 starting the counting in step 206 is equal to or greater than the first threshold value, the determination is positive, and the procedure advances to step 212. In step 210, if the count value of the counter 53 starting the counting in step 206 is less than the first threshold value, the determination is negative, and the procedure advances to step 213.

It should be noted that, in current step 210, the case where the determination is positive means a case where the first synchronization signal (refer to FIG. 18) corresponding to the R image information is input to the setting section 52. In current step 210, the case where the determination is negative means a case where the first synchronization signal (refer to FIG. 18) corresponding to the G image information or the first synchronization signal (refer to FIG. 18) corresponding to the B image information is input to the setting section 52.

In step 213, the counter 53 resets the count value which is obtained by starting the counting in step 206, and thereafter the procedure advances to step 202. It should be noted that the reset in current step 213 and step 214 to be described later means that the count value is returned to an initial setting value (for example "0").

In step 212, the setting section 52 turns on the R identification flag and the output permission flag, and thereafter the procedure advances to step 214.

In step 214, the counter 53 resets the previous count value which is obtained by starting the counting in step 206 or current step 214, then restarts the counting, and thereafter the procedure advances to step 216.

In step 216, the setting section 52 determines whether or not the scan end signal is input. In step 216, if the scan end signal is input, the determination is positive, and the procedure advances to step 218. In step 216, if the scan end signal is not input, the determination is negative, and the determination of step 200 is performed again.

In step 218, the setting section 52 turns off various flags, and thereafter ends the current flag setting process.

In contrast, in step 220, the setting section 52 determines whether or not the first PLL 50 is stopped. In step 220, if the first PLL 50 is stopped, the determination is positive, and the procedure advances to step 234 shown in FIG. 14. In step 220, if the first PLL 50 is not stopped, the determination is negative, and the procedure advances to step 222.

Figure 18:
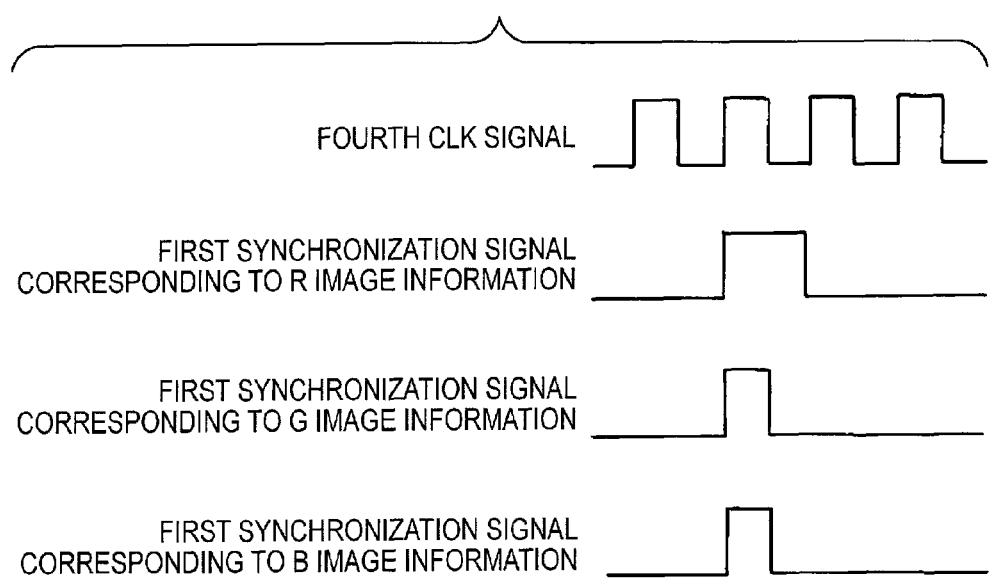
FIG. 18 is a waveform chart illustrating examples of the fourth CLK signal which is output by the first PLL and the first synchronization signals which are input from an AFE to the input/output circuit, in the first embodiment.

In step 222, the setting section 52 determines whether or not the first synchronization signal (for example, the first synchronization signal corresponding to the R image information, the G image information, or the B image information shown in FIG. 18) is detected. In step 222, if the first synchronization signal is detected, the determination is positive, and the procedure advances to step 224. In step 222, if the first synchronization signal is not detected, the determination is negative, and the procedure advances to step 230.

In step 224, the setting section 52 updates the color identification flags in the cyclic color order, and thereafter the procedure advances to step 226. The color identification flags are updated in the cyclic color order, for example, which means that the R identification flag is turned off and the G identification flag is turned on if the determination in step 222 is positive in a state where the R identification flag is turned on. Further, for example, the above sentence means that the G identification flag is turned off and the B identification flag is turned on if the determination in step 222 is positive in a state where the G identification flag is turned on. Furthermore, for example, the above sentence means that the B identification flag is turned off and the R identification flag is turned on if the determination in step 222 is positive in a state where the B identification flag is turned on.

In step 226, the setting section 52 determines whether or not the dummy output flag is turned on. In step 226, if the dummy output flag is turned on, the determination is positive, and the procedure advances to step 228. In step 226, if the dummy output flag is not turned on (if the flag is turned off), the determination is negative, and the procedure advances to step 214.

In step 228, the setting section 52 turns off the dummy output flag, and thereafter the procedure advances to step 214.

In step 230, the setting section 52 determines whether or not the count value of the counter 53 starting the counting in step 214 is equal to or greater than a second threshold value. Here, the second threshold value means, for example, the clock number of the fourth CLK signal corresponding to a time period which is obtained by adding a predetermined time period (for example, a time period corresponding to two clocks of the fourth CLK signal) to the first synchronization signal output interval.

In step 230, if the count value of the counter 53 starting the counting in step 214 is equal to or greater than the second threshold value, the determination is positive, and the procedure advances to step 232. In step 230, if the count value of the counter 53 starting the counting in step 214 is less than the second threshold value, the determination is negative, and the procedure advances to step 220.

In step 232, the setting section 52 turns on the dummy output flag, and thereafter the procedure advances to step 214.

Figure 14:
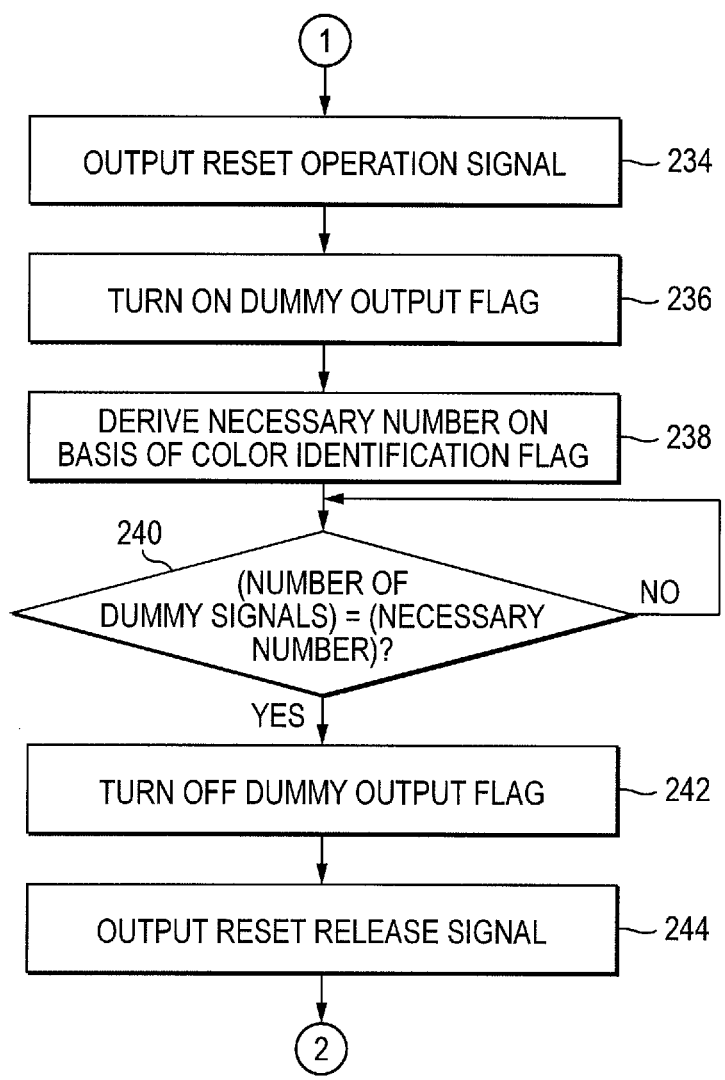
FIG. 14 is a part subsequent to the flowchart shown in FIG. 13.

In contrast, in step 234 shown in FIG. 14, the setting section 52 outputs the reset operation signal to the first PLL 50, and thereafter the procedure advances to step 236. The first PLL 50 performs the reset in response to the input of the reset operation signal from the setting section 52.

In step 236, the setting section 52 turns on the dummy output flag, and thereafter the procedure advances to step 238.

In step 238, the setting section 52 derives the number of necessary dummy signals, which are output by the synchronization signal generation section 56, on the basis of the color identification flag which is turned on at the current time point, and thereafter the procedure advances to step 240. In addition, in current step 238, the number of necessary dummy signals is derived in accordance with the following Table 1.

TABLE 1

| TYPES OF IDENTIFICATION FLAGS | NUMBER OF NECESSARY DUMMY SIGNALS |
|---|---|
| R | 2 |
| G | 1 |
| B | 0 |

Here, the number of necessary dummy signals (for example, the number of necessary dummy signals shown in Table 1) is determined depending on the color identification flag which is turned on at the current time point, an output restart time period, and a specific color. The output start time period means a predetermined time period as a time period until the first PLL 50 restarts the output of the fourth CLK signal. The time period until the output of the fourth CLK signal is restarted means, in other words, a time period until the generation of the fourth CLK signal is stabilized. The state where the generation of the fourth CLK signal is stabilized means, for example, a state where the fourth CLK signal, of which the clock number is three times the clock number of the first CLK signal, is continuously generated. The specific color means a predetermined color (here, for example, R) which is a color corresponding to the image information to be output to the control circuit 202 first.

After step 238 is executed, the number of dummy signals, which are output by the synchronization signal generation section 56, is counted by the counter 53.

In step 240, the setting section 52 determines whether or not the number of dummy signals counted by the counter 53 has reached the number of necessary dummy signals derived in step 238. In step 240, if the number of dummy signals counted by the counter 53 has reached the number of necessary dummy signals derived in step 238, the determination is positive, and the procedure advances to step 242. In step 240, if the number of dummy signals counted by the counter 53 has not reached the number of necessary dummy signals derived in step 238, the determination is negative, and the determination of step 240 is performed again.

In step 242, the setting section 52 turns off the dummy output flag, and thereafter the procedure advances to step 244.

In step 244, the setting section 52 outputs the reset release signal to the first PLL 50, and thereafter the procedure advances to step 214 shown in FIG. 13. The first PLL 50 releases the reset state in response to the input of the reset release signal from the setting section 52.

Next, a signal generation process, which is executed by the synchronization signal generation section 56, will be described with reference to FIG. 15.

In step 250, the synchronization signal generation section 56 determines whether or not the output permission flag is turned on. In step 250, if the output permission flag is turned on, the determination is positive, and the procedure advances to step 252. In step 250, if the output permission flag is not turned on (if the flag is turned off), the determination is negative, and the determination in current step 250 is performed again.

In step 252, the synchronization signal generation section 56 determines whether or not the dummy output flag is turned on. In step 252, if the dummy output flag is turned on, the determination is positive, and the procedure advances to step 258. In step 252, if the dummy output flag is not turned on (if the flag is turned off), the determination is negative, and the procedure advances to step 254.

In step 254, the synchronization signal generation section 56 determines whether or not the first synchronization signal is input from the AFE 20. In step 254, if the first synchronization signal is input from the AFE 20, the determination is positive, and the procedure advances to step 256. In step 254, if the first synchronization signal is not input from the AFE 20, the determination is negative, and the procedure advances to step 264.

In step 256, the synchronization signal generation section 56 generates the second synchronization signal and outputs the signal to the control circuit 202, and thereafter the procedure advances to step 264.

In step 258, the synchronization signal generation section 56 determines whether or not the time to generate the dummy signals has arrived. Here, the time to generate the dummy signals means a time when the determination in step 252 is positive, and a time when a time period corresponding to the first synchronization signal output interval has passed from the time point at which the dummy signal is previously output. In step 258, if the time to generate the dummy signals has arrived, the determination is positive, and the procedure advances to step 260. In step 258, if the time to generate the dummy signals has not arrived, the determination is negative, and the determination of current step 258 is performed again.

In step 260, the synchronization signal generation section 56 generates the dummy signal and outputs the signal to the control circuit 202, and thereafter the procedure advances to step 262. In addition, in current step 260, if the number of necessary dummy signals equal to or greater than "1" is derived in step 238 shown in FIG. 14, the dummy signal is generated and output. However, if the number of necessary dummy signals equal to "0" is derived, the dummy signal is not generated, and the procedure advances to step 262.

In step 262, the synchronization signal generation section 56 determines whether or not the dummy output flag is turned off. In step 262, if the dummy output flag is turned off, the determination is positive, and the procedure advances to step 264. In step 262, if the dummy output flag is not turned off (if the flag is turned on), the determination is negative, and the procedure advances to step 258.

In step 264, the synchronization signal generation section 56 determines whether or not the output permission flag is turned off. In step 264, if the output permission flag is not turned off (if the flag is turned on), the determination is negative, and the procedure advances to step 252. In step 264, if the output permission flag is turned off, the determination is positive, and the current signal generation process ends.

Next, an image information acquisition process, which is executed by the output holding section 54, will be described with reference to FIG. 16.

Figure 16:
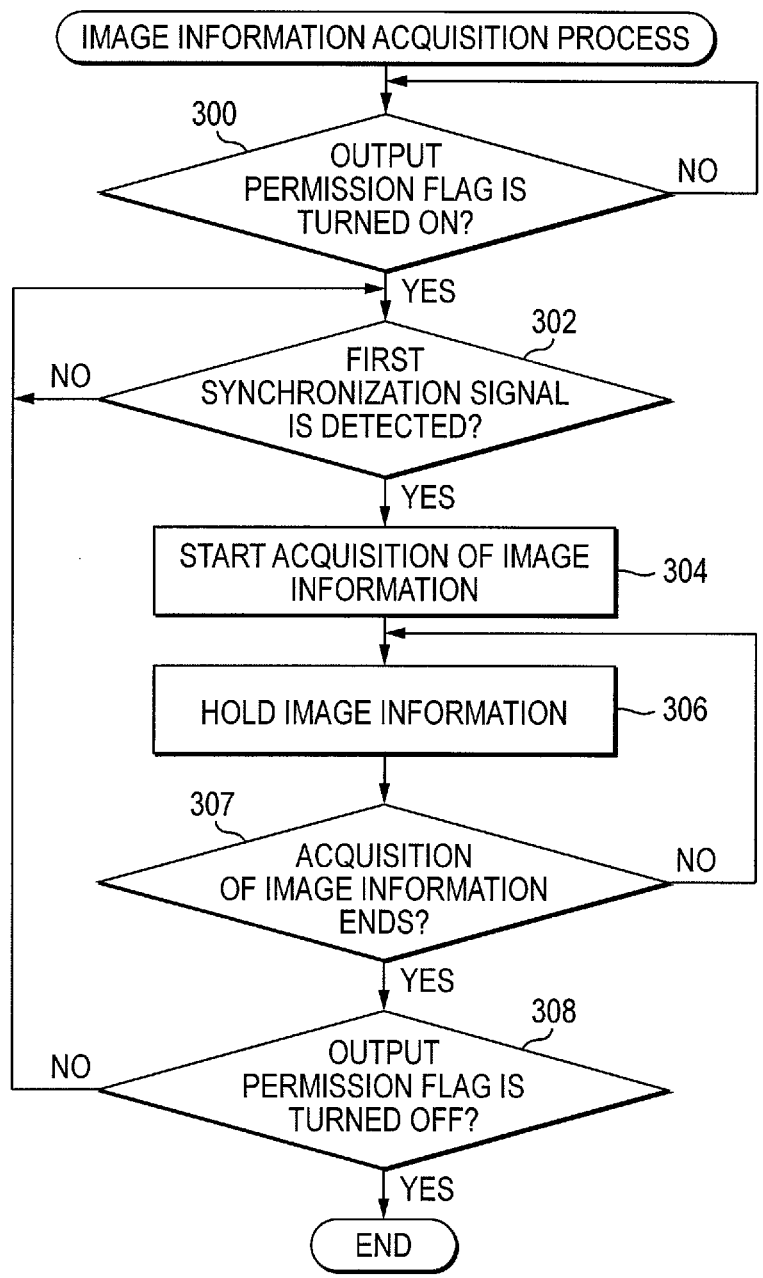
FIG. 16 is a flowchart illustrating an example of a flow of an image information acquisition process according to the first embodiment.

In the image information acquisition process shown in FIG. 16, first, in step 300, the output holding section 54 determines whether or not the output permission flag is turned on. In step 300, if the output permission flag is not turned on (if the flag is turned off), the determination is negative, and the determination in current step 300 is performed again. In step 300, if the output permission flag is turned on, the determination is positive, and the procedure advances to step 302.

In step 302, the output holding section 54 determines whether or not the first synchronization signal is input. In step 302, if the first synchronization signal is not input, the determination is negative, and the determination of current step 302 is performed again. In step 302, if the first synchronization signal is input, the determination is positive, and the procedure advances to step 304.

In step 304, the output holding section 54 starts the acquisition of the image information which is output by the AFE 20, and thereafter the procedure advances to step 306.

In step 306, the output holding section 54 holds the acquired image information by storing the information in the memory 55, and the procedure advances to step 307.

In step 307, the output holding section 54 determines whether or not the acquisition of the image information corresponding to the first synchronization signal, which is input in step 302, ends. In step 307, if the acquisition of the image information corresponding to the first synchronization signal, which is input in step 302, does not end, the determination is negative, and the procedure advances to step 306. In step 307, if the acquisition of the image information corresponding to the first synchronization signal, which is input in step 302, ends, the determination is positive, and the procedure advances to step 308.

In step 308, the output holding section 54 determines whether or not the output permission flag is turned off. In step 308, if the output permission flag is not turned off (if the flag is turned on), the determination is negative, and the procedure advances to step 302. In step 308, if the output permission flag is turned off, the determination is positive, and the current image information acquisition process ends.

Next, an image information output process, which is executed by the output holding section 54, will be described with reference to FIG. 17.

Figure 17:
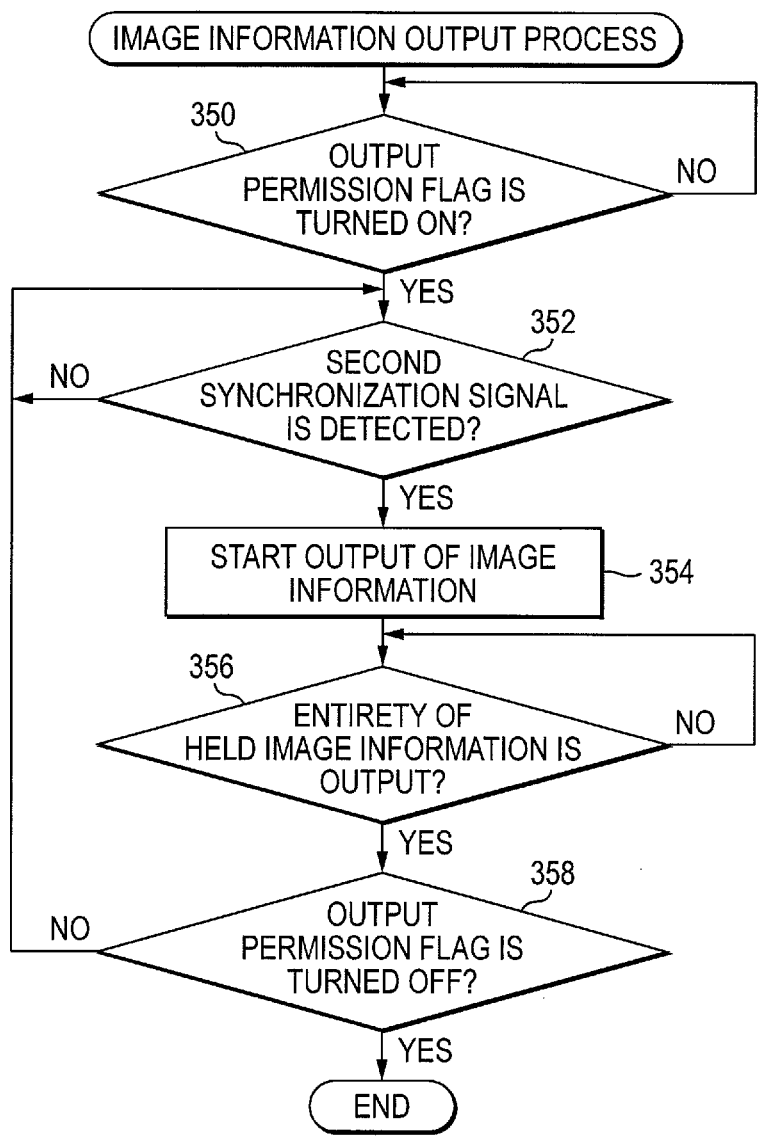
FIG. 17 is a flowchart illustrating an example of a flow of an image information output process according to the first embodiment.

In the image information output process shown in FIG. 17, first, in step 350, the output holding section 54 determines whether or not the output permission flag is turned on. In step 350, if the output permission flag is not turned on (if the flag is turned off), the determination is negative, and the determination in current step 350 is performed again. In step 350, if the output permission flag is turned on, the determination is positive, and the procedure advances to step 352.

In step 352, the output holding section 54 determines whether or not the second synchronization signal is input. In step 352, if the second synchronization signal is not input, the determination is negative, and the determination of current step 352 is performed again. In step 352, if the second synchronization signal is input, the determination is positive, and the procedure advances to step 354.

In step 354, the output holding section 54 outputs the image information, which is held (stored in the memory 55 at the current time point), to the control circuit 202, and thereafter the procedure advances to step 356.

In step 356, the output holding section 54 determines whether or not the entirety of the held image information is output to the control circuit 202. In step 356, if the entirety of the held image information is not output to the control circuit 202, the determination is negative, and the determination of current step 356 is performed again. In step 356, if the entirety of the held image information is output to the control circuit 202, the determination is positive, and the procedure advances to step 358.

In step 358, the output holding section 54 determines whether or not the output permission flag is turned off. In step 358, if the output permission flag is not turned off (if the flag is turned on), the determination is negative, and the procedure advances to step 352. In step 358, if the output permission flag is not turned off, the determination is positive, and the image information output process ends.

Figure 19:
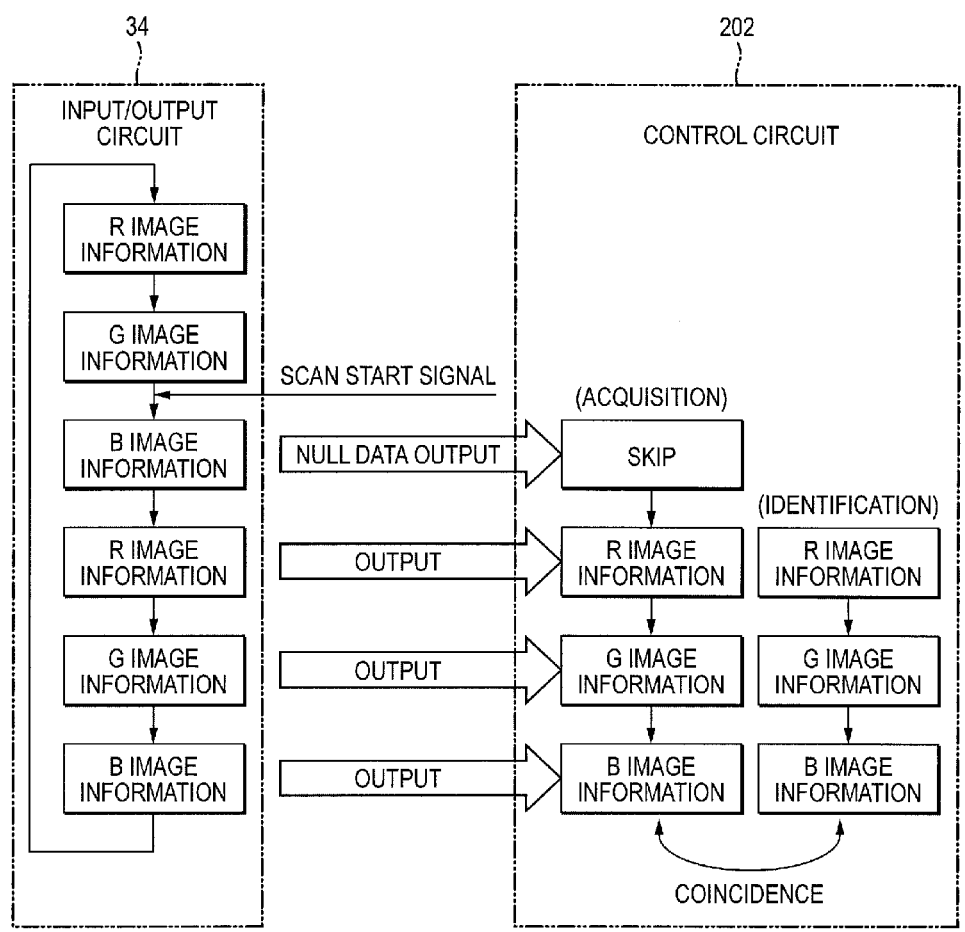
FIG. 19 is a conceptual diagram illustrating an example of cyclic color orders of image information pieces respectively acquired by the input/output circuit and the control circuit and cyclic color orders identified by the control circuit, in the first embodiment.

As described above, when the output holding section 54 executes the image information output process, a color corresponding to the image information, which is output by the input/output circuit 34, coincides with, for example, a color corresponding to the image information which is acquired by the control circuit 202 as shown in FIG. 19. Further, comparing the example shown in FIG. 7 with the example shown in FIG. 19, the examples are different in the following points. In the example shown in FIG. 7, the acquired cyclic color order does not coincide with the identified cyclic color order. In contrast, in the example shown in FIG. 19, the acquired cyclic color order coincides with the identified cyclic color order. As described above, the acquired cyclic color order coincides with the identified cyclic color order. The reason is that the setting section 52 turns on the output permission flag, and then the output holding section 54 executes the image information acquisition process and the image information output process.

In the example shown in FIG. 19, after the R image information is output by the AFE 20, before the B image information is output, the scan start signal is input to the input/output circuit 34. In this case (in a case where the timing of inputting the scan start signal to the input/output circuit 34 does not coincide with a timing at which the AFE 20 outputs the R image information), the input/output circuit 34 starts outputting the image information from the R image information without outputting the B image information (but outputting null data). Thereby, the control circuit 202 skips the acquisition operation for the B image information, and acquires the image information again from the R image information since the B image information is not input from the input/output circuit 34 (null data is output by the input/output circuit 34). Accordingly, in the control circuit 202, the image information pieces are acquired in an order of the R image information, the G image information, and the B image information, the image information pieces are identified in order of the R image information, the G image information, and the B image information, and the process is performed on the acquired image information in the acquisition order.

Further, in the information processing apparatus 10 according to the embodiment, the scan start signal using color identification flags of RGB or the like is input to the input/output circuit 34 for each of the image information pieces. Compared with a case where the input/output circuit 34 outputs both of the image information and the scan start signal to the control circuit 202 together with the synchronization signal irrespective of the colors, the control circuit 202 identifies colors corresponding to the image information pieces in the cyclic color order from a specific color by exchanging a small volume of data.

In contrast, comparing the example shown in FIG. 9 with the example shown in FIG. 20, those are different in the following point. When noise interferes with the input of the first synchronization signal corresponding to the G image information, the dummy signal is not output in the example shown in FIG. 9, while the dummy signal is output in the example shown in FIG. 20.

Figure 15:
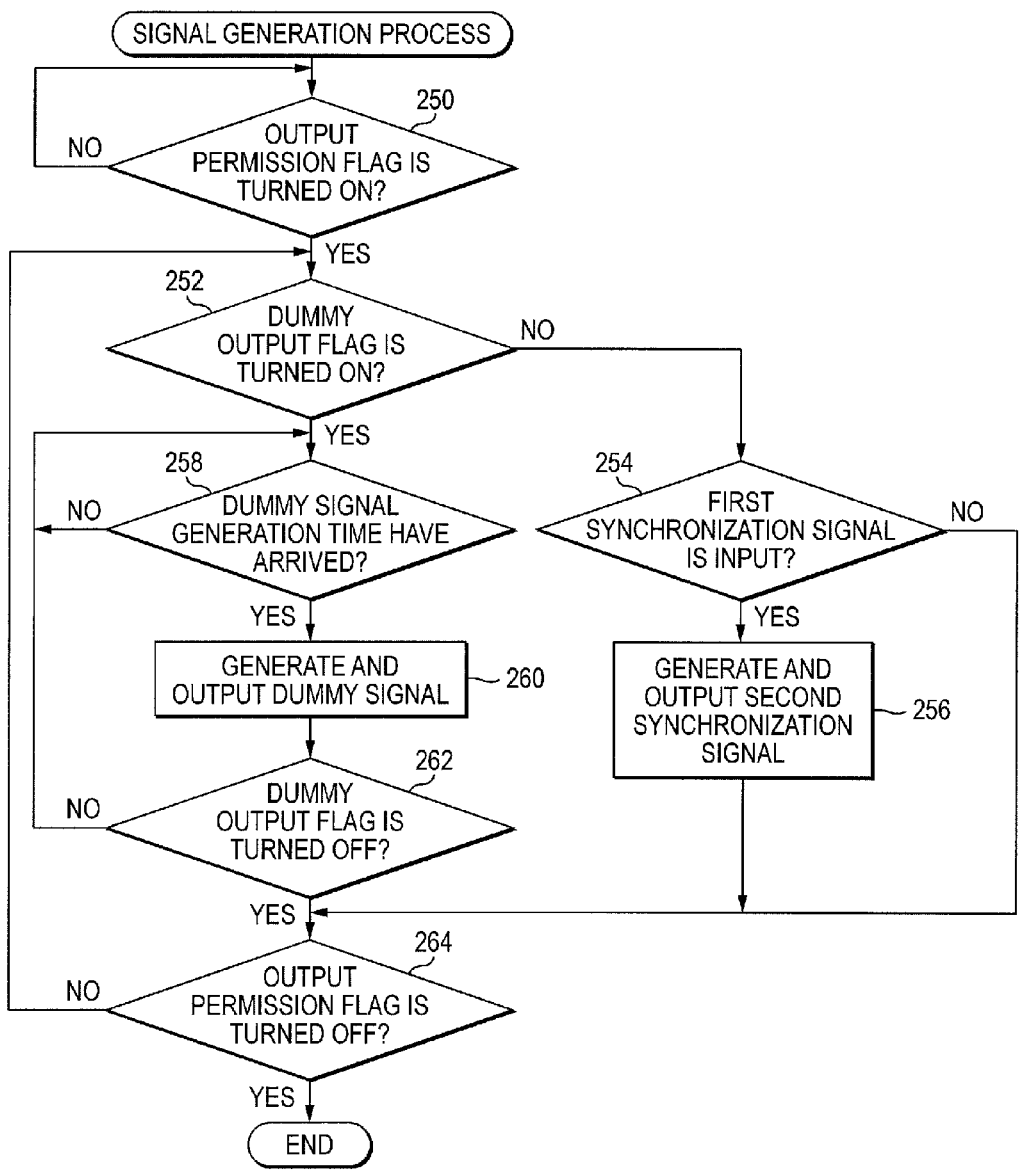
FIG. 15 is a flowchart illustrating an example of a flow of a signal generation process according to the first embodiment.
Figure 20:
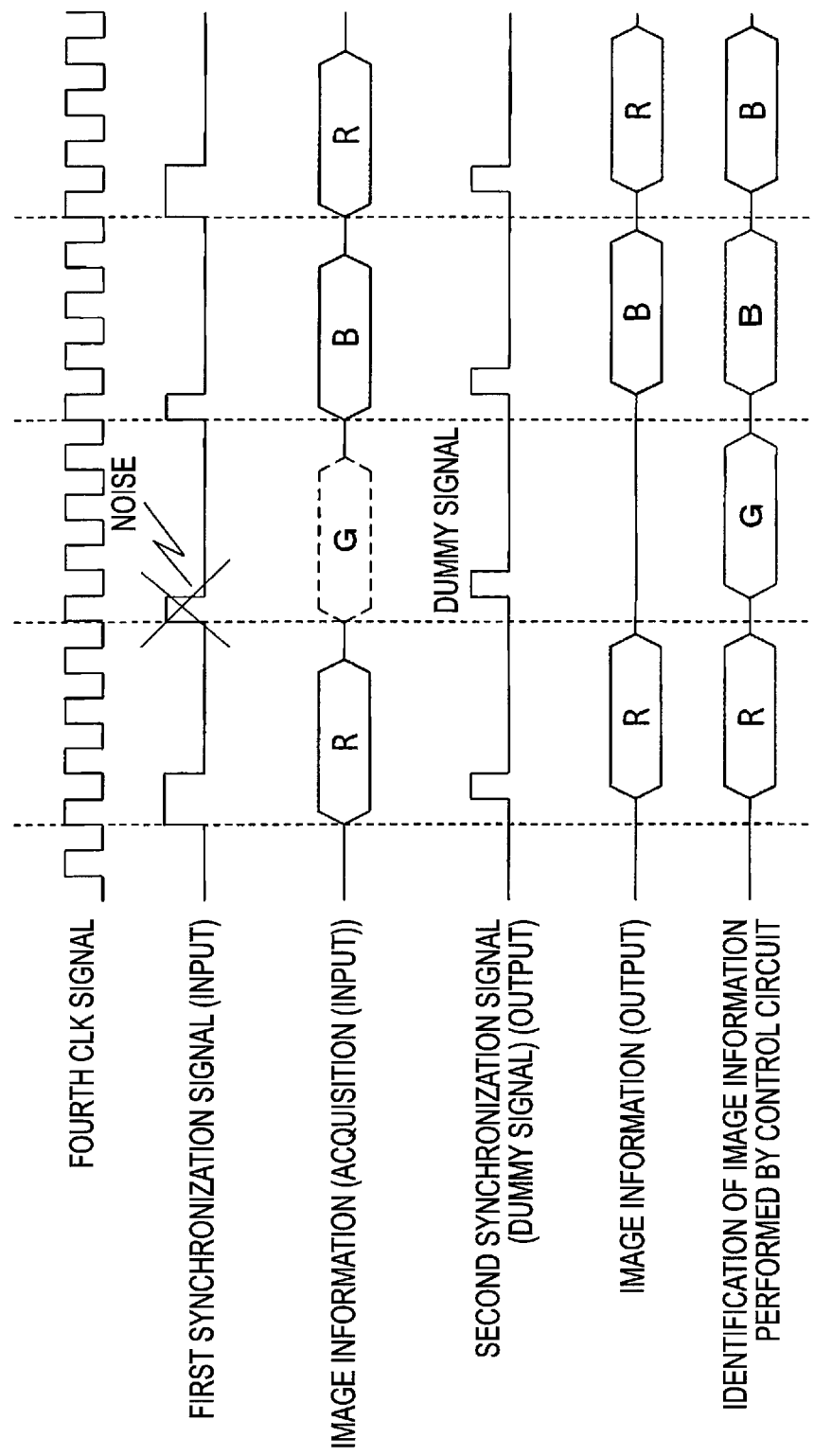
FIG. 20 is a timing chart illustrating an example (an exemplary case where noise interferes with an input of the first synchronization signal) of the signals which are input to the input/output circuit, the fourth CLK signal which is generated and output from the inside of the input/output circuit, the signals which are output by the input/output circuit, and the cyclic color order identified by the control circuit, in the first embodiment.

If the output permission flag is turned on, for example, as shown in FIG. 20, in response to the input of the first synchronization signal (step 254 of FIG. 15: Y), the input/output circuit 34 generates and outputs the second synchronization signal (step 256 of FIG. 15). The control circuit 202 acquires the image information in synchronization with the input of the second synchronization signal. Here, when noise interferes with the input of the first synchronization signal corresponding to the G image information (step 230 of FIG. 13: Y), the input/output circuit 34 generates and outputs the dummy signal instead of the second synchronization signal without outputting the G image information (but outputting null data) (step 260 of FIG. 15).

In this case, the control circuit 202 skips the acquisition operation for the G image information, and identifies that the G image information is acquired by inputting the dummy signal from the input/output circuit 34. Subsequently, the input/output circuit 34 restarts the input of the first synchronization signal (step 254 of FIG. 15: Y), and generates and outputs the second synchronization signal again (step 256 of FIG. 15). When restarting the output of the second synchronization signal, the input/output circuit 34 outputs the image information (the B image information in the example shown in FIG. 20) in synchronization with the restart. The control circuit 202 restarts the acquisition of the image information in synchronization with the re-input of the second synchronization signal, and identifies a color (B in the example shown in FIG. 20) corresponding to the acquired image information.

That is, the control circuit 202 identifies that the image information is acquired even when the image information is not actually acquired, since the dummy signal is input until the output of the first synchronization signal is restarted. As a result, the acquired cyclic color order coincides with the identified cyclic color order. Accordingly, even when noise interferes with the input of the first synchronization signal, the colors corresponding to the image information pieces are prevented from being mismatched (the colors of the images indicated by the image information pieces which are output through the image processing of the control circuit 202 are prevented from being mismatched) in the following stage from the control circuit 202. In addition, the following stage from the control circuit 202 means the control circuit 202 and a post-stage circuit (a circuit which is positioned after the control circuit 202) that acquires and deals with the image information which is output by the control circuit 202.

In contrast, comparing the example shown in FIG. 10 with the example shown in FIG. 21, those are different in the following point. When noise interferes with the input of the first synchronization signal corresponding to the G image information, the dummy signal is not output in the example shown in FIG. 10, while the dummy signal is output in the example shown in FIG. 21.

Figure 21:
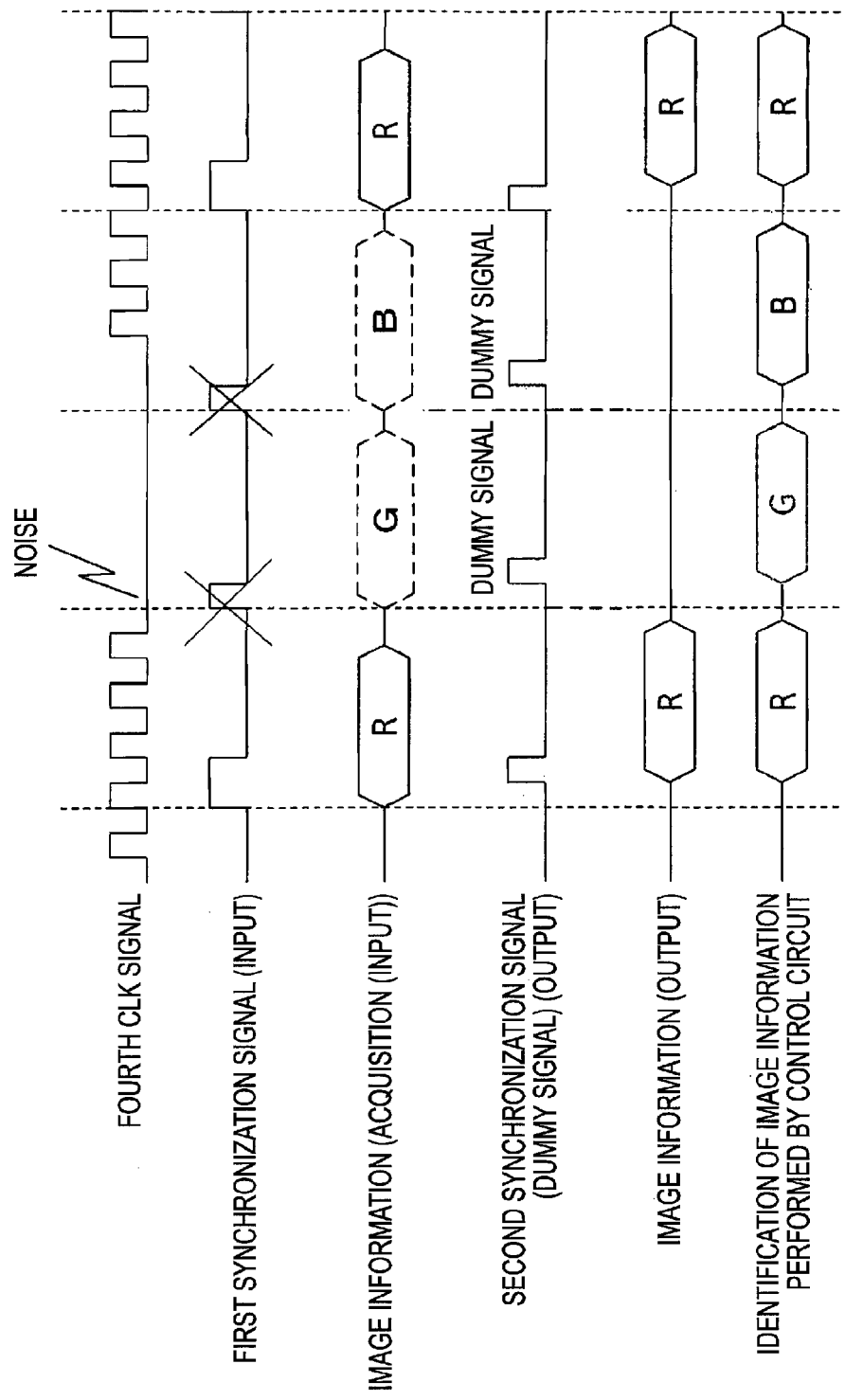
FIG. 21 is a timing chart illustrating an example (an exemplary case where noise interferes with an output of the fourth CLK signal) of the signals which are input to the input/output circuit, the fourth CLK signal which is generated and output from the inside of the input/output circuit, the signals which are output by the input/output circuit, and the cyclic color order identified by the control circuit, in the first embodiment.

In the present first embodiment, for example, as shown in FIG. 21, even when the first synchronization signal is not input and the second synchronization signal is not generated since noise interferes with the output of the fourth CLK signal, the dummy signal is output to the control circuit 202. In this case, the control circuit 202 identifies that the image information is acquired even when the image information is not actually acquired, since the dummy signal is input until the output of the fourth CLK signal is restarted. As a result, the acquired cyclic color order coincides with the identified cyclic color order. Accordingly, even when noise interferes with the output of the fourth CLK signal, the colors corresponding to the image information pieces are prevented from being mismatched in the following stage from the control circuit 202.

The first embodiment showed the exemplary case where the first synchronization signal is not input due to the effect of noise. However, the present invention is not limited to this, and it is needless to say that the present invention may be applied to a case where the first synchronization signal is not input due to a cause (for example, contact failure) other than noise.

Further, the first embodiment showed the exemplary case of outputting the number of dummy signals uniquely derived in response to the color identification flags on the premise that the timing of restarting the fourth CLK signal is given. However, the present invention is not limited to this. For example, the synchronization signal generation section 56 may generate and output the second synchronization signal, when the R identification flag is turned on, by outputting the dummy signal in a time period from when the dummy output flag is turned on to when the dummy output flag is turned off and the R identification flag is turned on. In this case, it is the premise that the color identification flags are updated. However, the color identification flags may be updated in the cyclic color order whenever the dummy signal, which is output by the synchronization signal generation section 56, is detected by the setting section 52. In addition, the time period until the dummy output flag is turned off and the R identification flag is turned on, in other words, means a time period in which the dummy output flag is turned off and the G identification flag or B identification flag is turned on.

Further, the first embodiment showed the exemplary case where R is a color corresponding to the image information which is output to the control circuit 202 first by the input/output circuit 34 after the scan start signal is input to the image processing circuit 22. However, the present invention is not limited to this. The image information, which is output to the control circuit 202 first by the input/output circuit 34 after the scan start signal is input to the image processing circuit 22, may be determined depending on which color image information the control circuit 202 performs the image processing in a cyclic color order from. Accordingly, when the control circuit 202 performs the image processing in the cyclic color order from the G image information, G is a color corresponding to the image information which is output to the control circuit 202 first by the input/output circuit 34 after the scan start signal is input to the image processing circuit 22. Further, when the control circuit 202 performs the image processing in the cyclic color order from the B image information, B is a color corresponding to the image information which is output to the control circuit 202 first by the input/output circuit 34 after the scan start signal is input to the image processing circuit 22.

Further, in the first embodiment, the duration (pulse width) of the first synchronization signal corresponding to the G image information is not set to be different from the duration of the first synchronization signal corresponding to the B image information. However, the present invention is not limited to this. For example, the duration of the first synchronization signal corresponding to the R image information, the duration of the first synchronization signal corresponding to the G image information, and the duration of the first synchronization signal corresponding to the B image information may be set to be different. Thereby, the setting section 52 identifies which color image information is input by measuring the duration of the first synchronization signal.

Further, the first embodiment showed the exemplary case where the AFE 20 outputs a pulse, of which the signal level is shifted from the low level to the high level, as the first synchronization signal. However, the present invention is not limited to this. For example, a signal, of which the signal level is shifted from the high level to the low level, may be output as the first synchronization signal. In this case, a color, which corresponds to the image information, is identified on the basis of the duration of the low level part of the first synchronization signal.

Further, in the description of the first embodiment, it is the premise that a pulse of the first synchronization signal is a rectangular wave. However, the present invention is not limited to this. For example, the pulse, which is the first synchronization signal, may be a pulse having a different shape such as a triangular wave or a saw-tooth wave. Further, the shape of the pulse may be changed for each color of RGB. In this case, each color of RGB is uniquely specified on the basis of the shape of the pulse.

Further, the first embodiment showed the exemplary case where the color is identified on the basis of the pulse width which is the duration of the pulse as the first synchronization signal. However, the present invention is not limited to this. For example, the AFE 20 may output pulses, of which the number corresponds to that of the colors, or a pulse, of which the height corresponds to that of the color, as the first synchronization signal. Further, the number of pulses may be changed separately for each color of RGB, or the height of the pulse may be changed separately for each color of RGB. In this case, each color of RGB is uniquely specified on the basis of the number of pulses or the height of the pulse.

Further, the first embodiment showed the exemplary case where the input/output circuit 34 identifies a color corresponding to the image information on the basis of the first synchronization signal. However, the present invention is not limited to this, and the color corresponding to the image information may be identified using another color identification method. In an example of another color identification method, the AFE 20 stores a color identifier for identifying a color corresponding to the image information, which is input from the photoelectric conversion element 156, in free space within the image information, and outputs the image information having the color identifier to the input/output circuit 34. In this case, the input/output circuit 34 acquires the color identifier from the image information, and identifies the color corresponding to the image information on the basis of the acquired color identifier.

In addition, it is not necessary for the color identifier to be stored in the free space within the image information, in the first method (the color identification method described in the first embodiment) in which the AFE 20 generates and outputs the first synchronization signal with the duration corresponding to the color and the input/output circuit 34 identifies the color corresponding to the image information on the basis of the duration of the first synchronization signal. Hence, compared with the method of storing the color identifier in the free space within the image information, the color identification method described in the first embodiment is advantageous in that the free space within the image information may be used for another application.

Second Embodiment

The first embodiment showed the exemplary case where the cyclic color orders, which are identified as cyclic color orders of the image information pieces acquired by the control circuit 202, are made to coincide using the color identification flags. However, a present second embodiment will describe a case of making the cyclic color orders coincide without using the color identification flags. It should be noted that, in the present second embodiment, the same elements as the elements described in the first embodiment will be represented by the same reference numerals and signs, and a description thereof will be omitted. Further, in the present second embodiment, differences between the present embodiment and the first embodiment will be described.

Next, the effect of the present second embodiment will be described. First, a flag setting process executed by the setting section 52 will be described with reference to FIGS. 22 and 23. In addition, in the following description, for convenience of description, for example, as shown in FIG. 25, when the first synchronization signal is input to the input/output circuit 34, it is the premise that the first synchronization signal is input at the interval A.

Figure 22:
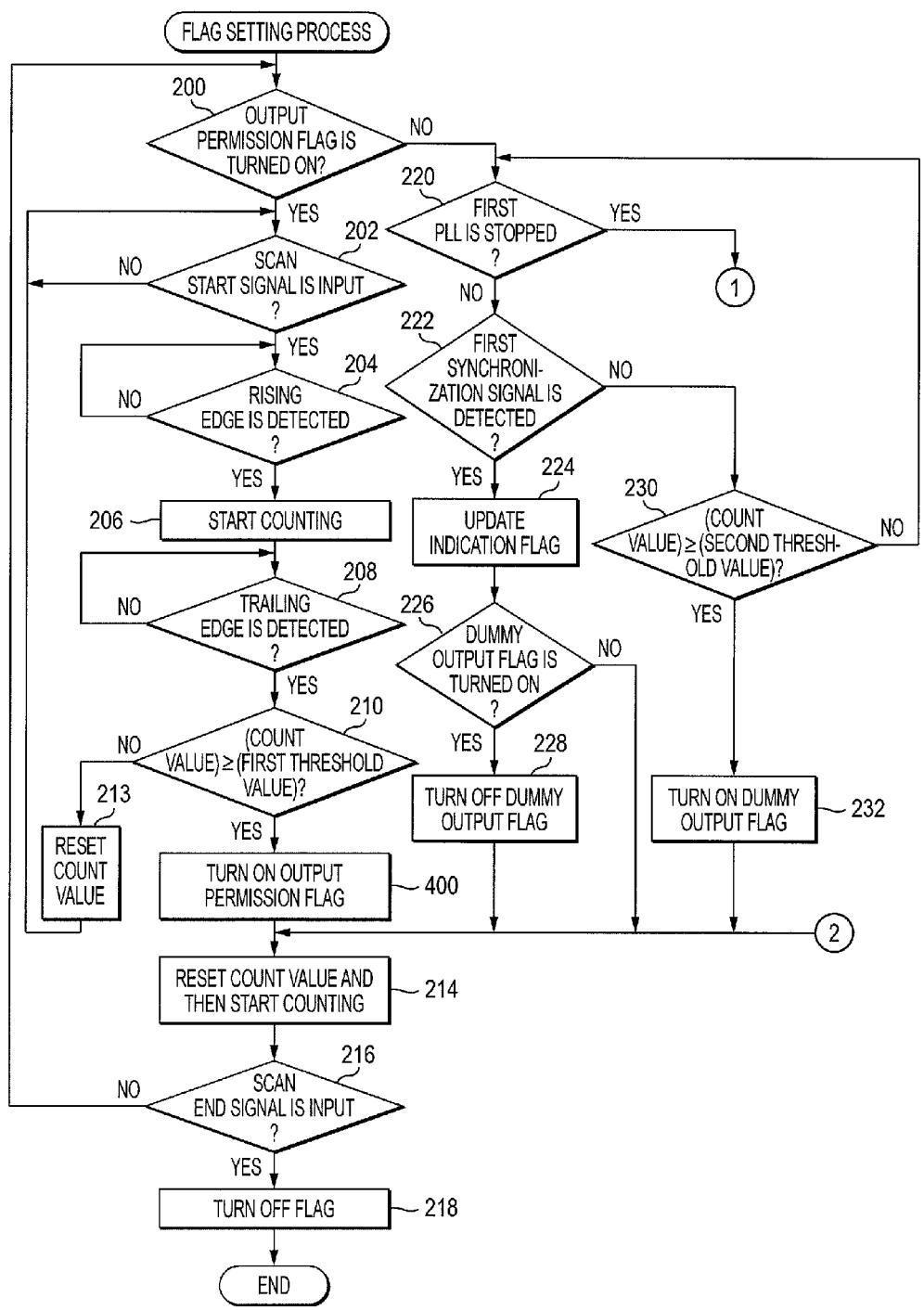
FIG. 22 is a flowchart illustrating an example of a flow of a flag setting process according to the second embodiment.
Figure 23:
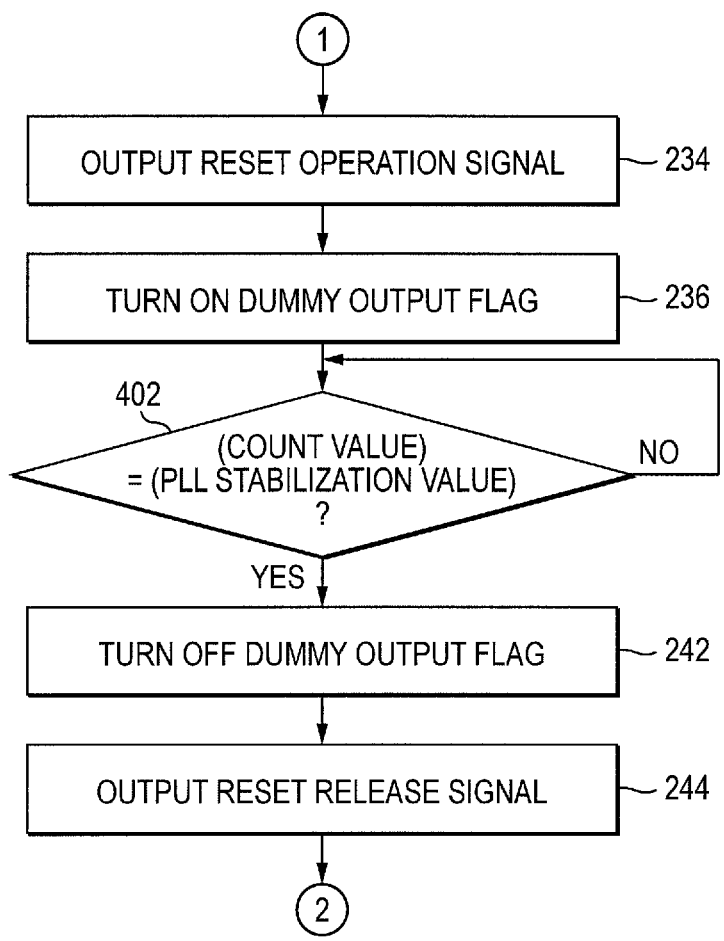
FIG. 23 is a part subsequent to the flowchart shown in FIG. 22.

The flag setting process shown in FIGS. 22 and 23 is different from the flag setting process shown in FIG. 13 in that step 400 is provided instead of step 212 and step 402 is provided instead of steps 238 and 240.

In step 400, the setting section 52 turns on the output permission flag, and thereafter the procedure advances to step 214.

In step 402, the setting section 52 determines whether or not the count value of the counter 53 starting the counting in step 214 is a PLL stabilization value. Here, the PLL stabilization value means a predetermined clock number (an example of a predetermined condition according to the present invention) as a clock number of the fourth CLK signal which is necessary for stabilization of the generation of the fourth CLK signal.

In step 402, if the count value of the counter 53 starting the counting in step 214 is equal to or greater than the PLL stabilization value, the determination is positive, and the procedure advances to step 242. In step 402, if the count value of the counter 53 starting the counting in step 214 is less than the PLL stabilization value, the determination is negative, and the determination of current step 402 is performed again.

Figure 24:
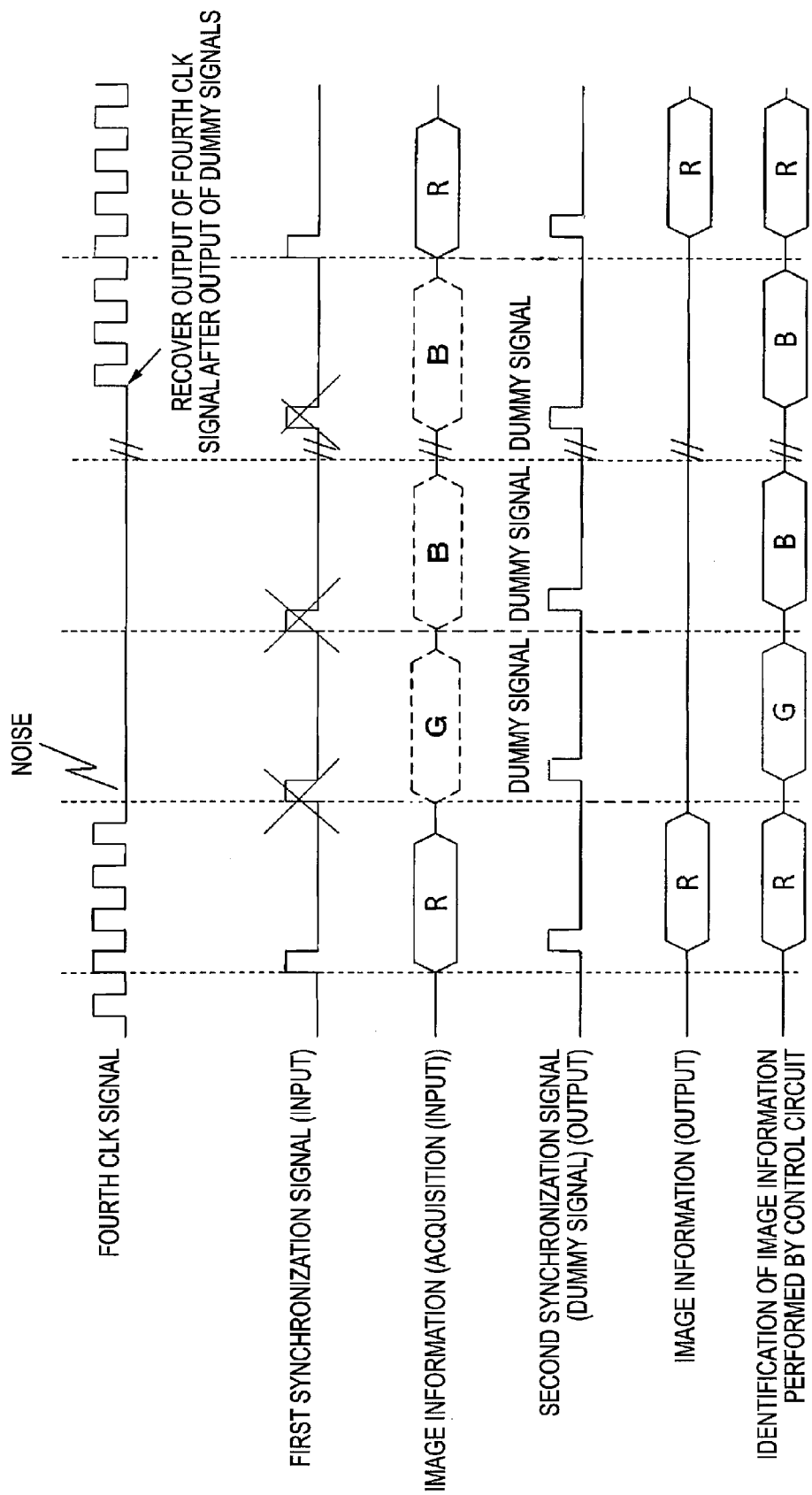
FIG. 24 is a timing chart illustrating an example (an exemplary case where noise interferes with an output of the fourth CLK signal) of the signals which are input to the input/output circuit, the fourth CLK signal which is generated and output from the inside of the input/output circuit, the signals which are output by the input/output circuit, and the cyclic color order identified by the control circuit, in the second embodiment.

As described above, by executing the flag setting process shown in FIGS. 22 and 23, for example, as shown in FIG. 24, while the first PLL 50 is stopped due to the effect of noise, the dummy signal is output from the input/output circuit 34 to the control circuit 202. That is, the dummy signal is output at an output interval corresponding to the first synchronization signal output interval until the fourth CLK signal is generated and stably output. The output of the fourth CLK signal is restarted (recovered) after the output of the dummy signal. When the output of the fourth CLK signal is restarted, the first synchronization signal is input, and the second synchronization signal is generated and output in accordance with the input. When the second synchronization signal is output, the image information is output again in synchronization with the output.

The control circuit 202 identifies that the image information is acquired, by periodically inputting the dummy signals in the time period until the output of the fourth CLK signal is restarted. As a result, the acquired cyclic color order coincides with the identified cyclic color order. Accordingly, even when noise interferes with the output of the fourth CLK signal, the colors are prevented from being mismatched in an image indicated by the image information which is output through the image processing by the control circuit 202.

Figure 26:
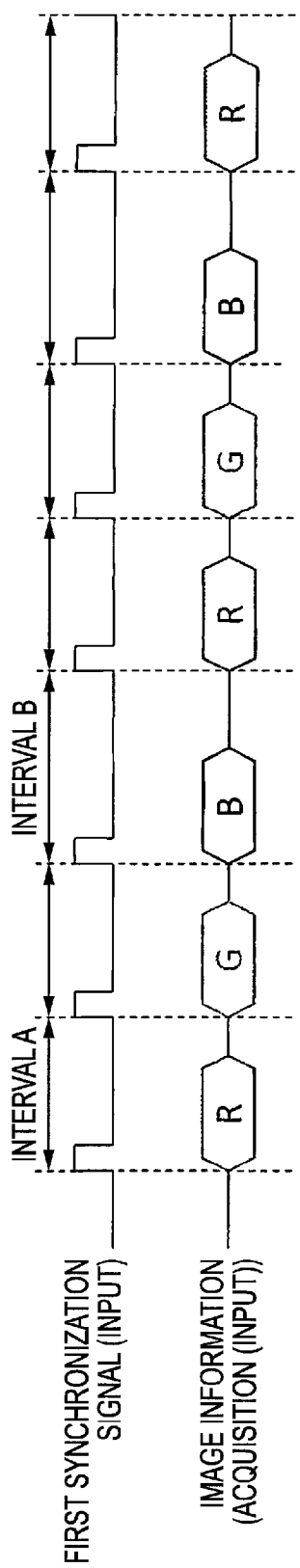
FIG. 26 is a timing chart illustrating an example (an exemplary case where only an input interval between the first synchronization signal corresponding to B-image information and the first synchronization signal corresponding to R-image information is different from other input intervals) of the first synchronization signal and the image information which are input to the input/output circuit according to the first and second embodiments.

In addition, in the description of the embodiments, for example, as shown in FIG. 25, it is the premise that the first synchronization signal is input at the interval A. However, the present invention is not limited to this. For example, as shown in FIG. 26, only the input interval between the first synchronization signal corresponding to the B image information and the first synchronization signal corresponding to the R image information subsequent thereto may be an interval B. Even in this case, the timing of restarting the output of the fourth CLK signal is subsequent to the output of the dummy signal.

Further, the flag setting process, the signal generation process, the image information acquisition process, and the image information output process (hereinafter referred to as "various processes" when it is not necessary for these to be separately described) described in the embodiments are just examples. Accordingly, it is needless to say that an unnecessary step may be deleted, a new step may be added, or the process order may be changed without departing from the scope of the invention. Furthermore, each process included in various processes described in the embodiments is executed by the input/output circuit 34 as the FPGA. However, by executing a program, each process may be implemented by a software configuration using a computer. Moreover, each process included in the various processes may be implemented by combination between a hardware configuration and a software configuration.

Further, when each process included in various processes described in the embodiments is intended to be implemented by a software configuration, for example, the CPU in the computer including the CPU, the primary storage section, and the secondary storage section executes various processing programs so as to perform various processes. Here, the various processing programs may be stored in the secondary storage section (for example, a flash memory). The CPU reads out the various processing programs from the secondary storage section, and develops the programs into the primary storage section (for example, a RAM). In this case, the CPU operates as the setting section 52 that executes the flag setting process (refer to FIGS. 13, 14, 22, and 23) by executing a flag setting program. Further, the CPU operates as the synchronization signal generation section 56 that executes the signal generation process (refer to FIG. 15) by executing a signal generation program. The CPU operates as the output holding section 54 that executes the image information acquisition process (refer to FIG. 16) by executing an image information acquisition program. Furthermore, the CPU operates as the output holding section 54 that executes the image information output process (refer to FIG. 17) by executing an image information output program.

Further, the embodiments showed, for convenience of description, the exemplary case where the image information in the image reading section 12 is output from the AFE 20 to the input/output circuit 34 and the input/output circuit 34 outputs the image information to the control circuit 202. However, the present invention is not limited to this. That is, the present invention is also applied to the following case: in a device other than the image reading section 12, the image information is output from one circuit to a different circuit, and the different circuit outputs the information to the post-stage circuit.

Further, the embodiments showed an example of the image information pieces respectively corresponding to the three colors of RGB. However, the present invention is not limited to this. That is, the present invention is also applied to the following case: the image information, which respectively corresponds to a plurality of predetermined colors (for example, yellow (Y), magenta (M), cyan (C), and black (K)), is output from one circuit to a different circuit, and the different circuit outputs the information to the post-stage circuit.

Third Embodiment

Hereinafter, specific examples of a third embodiment of the present invention will be described with reference to the drawings. However, the present invention is not limited to the following examples.

In order to facilitate understanding of the following description, in the drawings, the X-axis, Y-axis, and Z-axis directions correspond to the front-rear, left-right, and top-bottom directions, respectively; and the directions or sides indicated by the arrows X, −X, Y, −Y, Z, and −Z correspond to the forward, backward, rightward, leftward, upward, and downward directions, or the front, rear, right, left, upper, and lower sides.

In the drawings, a reference sign represented by "•" included in "O" is defined as an arrow directed from the rear side to the front side of the sheet, and a reference sign represented by "X" included in "O" is defined as an arrow directed from the front side to the rear side of the sheet.

In order to facilitate understanding of the following description, in the description referring to the drawings, the members unnecessary for the description are appropriately omitted in the drawings.

Figure 27:
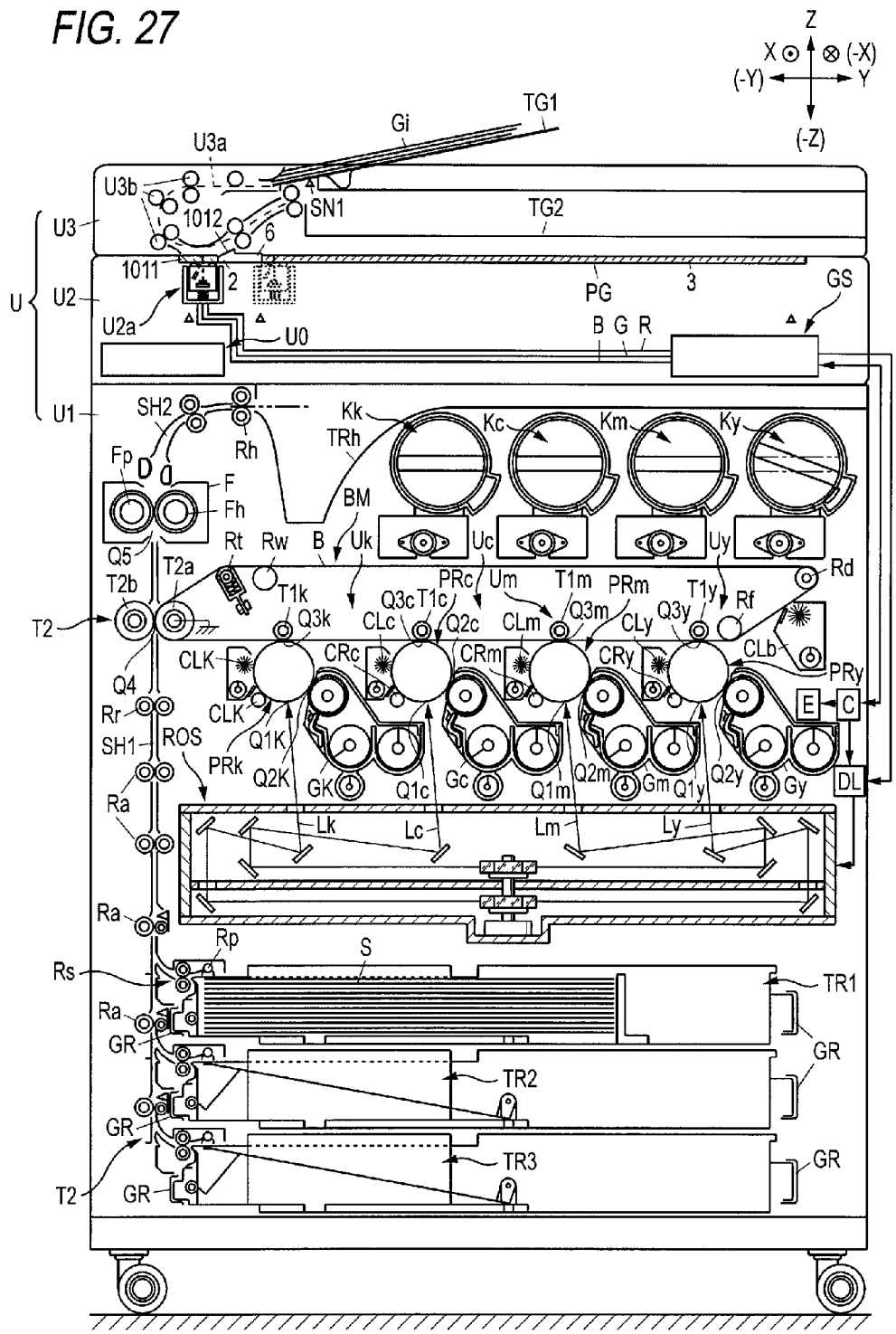
FIG. 27 is an explanatory diagram of the entirety of the image forming apparatus of a third embodiment.

FIG. 27 is an explanatory diagram of the entirety of the image forming apparatus of the third embodiment.

In FIG. 27, a copy machine U, which is an example of the image forming apparatus according to the third embodiment, includes a printer section U1, which is an example of a printing section and an example of an image printing device. A scanner section U2, which is an example of a reading section and an example of an image reading device, is supported on the printer section U1. An auto-feeder U3, which is an example of a document transport device, is supported on the scanner section U2. A user interface U0, which is an example of an input section, is supported on the scanner section U2 of the third embodiment. A user may operate the copy machine U by inputting instructions through the user interface U0.

An original document tray TG1, which is an example of the media container, is disposed on the auto-feeder U3. The original document tray TG1 may contain a stack of plural sheets of an original document Gi to be copied. An original document discharge tray TG2, which is an example of an original document discharging section, is disposed below the original document tray TG1. Original document transport rollers U3b are disposed along an original document transport path U3a between the original document tray TG1 and the original document discharge tray TG2.

A platen glass PG, which is an example of a transparent platen, is disposed on the top surface of the scanner section U2. In the scanner section U2 of the third embodiment, a reading unit U2a is disposed below the platen glass PG. The reading unit U2a of the third embodiment is supported so as to be movable in the left-right direction, which is a sub-scanning direction, along the lower surface of the platen glass PG. Normally, the reading unit U2a is stationary at the initial position indicated by the solid line of FIG. 27. In addition, the reading unit U2a is electrically connected to an image processing section GS.

Figure 28:
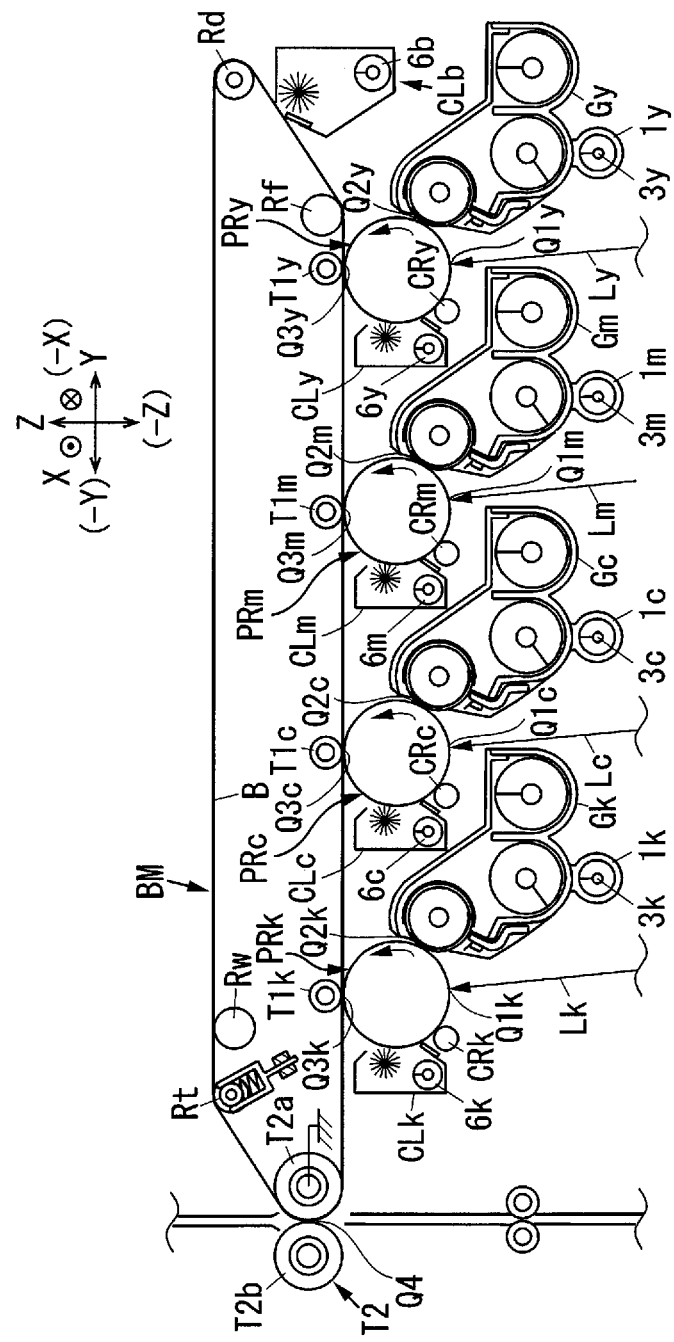
FIG. 28 is an explanatory diagram of the principal sections of an image printing section of the third embodiment.

FIG. 28 is an explanatory diagram of the principal sections of an image printing section of the third embodiment.

The image processing section GS is electrically connected to a writing circuit DL of the printer section U1. The writing circuit DL is electrically connected to an exposure device ROS, which is an example of a latent-image forming device.

The exposure device ROS of the third embodiment is configured to be capable of outputting laser beams Ly, Lm, Lc, and Lk corresponding to the respective colors of Y, M, C, and K as examples of writing beams. The exposure device ROS is configured to be capable of outputting the laser beams Ly to Lk corresponding to signals which are input from the writing circuit DL.

In FIG. 27, photoconductors PRy, PRm, PRc, and PRk, which are examples of image holding members, are disposed above the exposure device ROS. In FIGS. 27 and 28, regions in which the respective photoconductors PRy to PRk are irradiated with the laser beams Ly to Lk constitute writing regions Q1y, Q1m, Q1c, and Q1k.

Charging rollers CRy, CRm, CRc, and CRk, which are examples of charging units, are disposed upstream of the writing regions Q1y to Q1k in a direction of rotation of the photoconductors PRy, PRm, PRc, and PRk. The charging rollers CRy to CRk of the third embodiment are supported to be rotatable in contact with the photoconductors PRy to PRk.

Developing devices Gy, Gm, Gc, and Gk are disposed downstream of writing regions Q1y to Q1k in the direction of rotation of the photoconductors PRy to PRk. Regions in which the respective developing devices Gy to Gk face the respective photoconductors PRy to PRk constitute development regions Q2y, Q2m, Q2c, and Q2k.

Primary transfer rollers T1y, T1m, T1c, and T1k, which are examples of primary transfer units, are disposed downstream of the developing devices Gy to Gk in the direction of rotation of the photoconductors PRy to PRk. Regions in which the respective primary transfer rollers T1y to T1k face the respective photoconductors PRy to PRk constitute primary transfer regions Q3y, Q3m, Q3c, and Q3k.

Photoconductor cleaners CLy, CLm, CLc, and CLk, which are examples of cleaning units for the image holding members, are disposed downstream of the primary transfer rollers T1y to T1k in the direction of rotation of the photoconductors PRy to PRk.

The Y-color photoconductor PRy, the charging roller CRy, the exposure device ROS that outputs the Y-color laser beam Ly, the developing device Gy, the primary transfer roller T1y, and the photoconductor cleaner CLy constitute a Y-color image forming section Uy which is an example of a Y-color visible image formation device of the third embodiment that forms a toner image as an example of the visible image. Likewise, the photoconductors PRm, PRc, and PRk, the charging rollers CRm, CRc, and CRk, the exposure device ROS, the developing devices Gm, Gc, and Gk, the primary transfer rollers T1m, T1c, and T1k, and the photoconductor cleaners CLm, CLc, and CLk constitute image forming sections Um, Uc, and Uk for the M, C, and K colors.

A belt module BM, which is an example of an intermediate transfer device, is disposed above the photoconductors PRy to PRk. The belt module BM has an intermediate transfer belt B which is an example of an intermediate transfer member. The intermediate transfer belt B is constituted by an endless belt-like member.

The intermediate transfer belt B of the third embodiment is rotatably supported by: a belt driving roller Rd that is an example of a driving member; a tension roller Rt that is an example of a tension member; a working roller Rw that is an example of a member for correcting offset; an idler roller Rf that is a driven member; a backup roller T2a that is an example of a member facing the secondary transfer region; and the primary transfer rollers T1y, T1m, T1c, and T1k.

A secondary transfer roller T2b, which is an example of a secondary transfer member, is opposed to the backup roller T2a with the intermediate transfer belt B interposed therebetween. In the third embodiment, the backup roller T2a is grounded, and a secondary transfer voltage having a polarity opposite to a polarity of the charge of the toner is applied to the secondary transfer roller T2b from a power circuit E. The backup roller T2a and the secondary transfer roller T2b constitute the secondary transfer unit T2 of the third embodiment. Further, a region in which the secondary transfer roller T2b comes into contact with the intermediate transfer belt B constitutes a secondary transfer region Q4.

A belt cleaner CLb, which is an example of a cleaning unit for the intermediate transfer member, is disposed downstream of the secondary transfer region Q4 in a direction of rotation of the intermediate transfer belt B.

The primary transfer rollers T1y to T1k, the intermediate transfer belt B, the secondary transfer unit T2, and the like constitute a transfer device T1+T2+B of the third embodiment. Further, the image forming sections Uy to Uk and the transfer device T1+T2+B constitute an image printing section Uy to Uk+T1+T2+B of the third embodiment.

In FIG. 27, pairs of left and right guiding rails GR, which are examples of guiding members, are provided at three stages below the image forming sections Uy to Uk. Sheet feeding trays TR1 to TR3, which are examples of medium accommodating sections, are supported by the guiding rails GR so as to enter and exit in the front-rear direction. The sheet feeding trays TR1 to TR3 contain printing sheets S which are examples of the media.

Pickup rollers Rp, which are examples of unloading members, are disposed above the right sides of the sheet feeding trays TR1 to TR3. Separating rollers Rs, which are examples of separating members, are disposed downstream of the pickup rollers Rp in a transport direction of the printing sheets S. A sheet feeding path SH1, which is an example of a transport path of the media and extends upward, is formed downstream of the separating rollers Rs in the transport direction of the printing sheets S. Plural transport rollers Ra, which are examples of transport members, are disposed in the sheet feeding path SH1.

In the sheet feeding path SH1, registration rollers Rr, which are examples of members for adjusting transport timing, are disposed upstream of the secondary transfer region Q4.

A fixing device F is disposed downstream of the secondary transfer region Q4 in the transport direction of the sheets S. The fixing device F includes: a heating roller Fh which is an example of a heat fixing member; and a pressure roller Fp which is an example of a pressure fixing member. A region of contact between the heating roller Fh and the pressure roller Fp constitutes a fixing region Q5.

A sheet discharging path SH2, which is an example of a transport path, is disposed above the fixing device F. A discharged sheet tray TRh, which is an example of a medium discharging section, is formed on the upper surface of the printer section U1. The sheet discharging path SH2 extends toward the discharged sheet tray TRh. The sheet discharging roller Rh, which is an example of a medium transport member, is disposed at the downstream end of the sheet discharging path SH2.

(Description of Image Formation Operation)

In the copy machine U of the third embodiment having this configuration, when an operator manually places a sheet of the original document Gi on the platen glass PG and performs copying, the reading unit U2a moves from the initial position in the left-right direction, and scans the sheet of the original document Gi on the platen glass PG while performing exposure thereon. Further, when the sheet of the original document Gi is automatically transported using the auto-feeder U3 and is subjected to copying, the reading unit U2a moves from the initial position, and stops at a position for reading the sheet of the original document indicated by the dashed line of FIG. 27. Then, the plural sheets of the original document Gi contained in the original document tray TG1 are sequentially transported to and passed through the position for reading the sheet of the original document on the platen glass PG, and are discharged to the original document discharge tray TG2. Consequently, the sheets of the original document Gi, which sequentially pass through the reading position on the platen glass PG, are scanned by being exposed through the stationary reading unit U2a. In addition, light reflected from the original document Gi is received by the reading unit U2a. The reading unit U2a converts the received reflected light of the original document Gi into an electrical signal.

The electrical signal, which is output from the reading unit U2a, is input to the image processing section GS. The image processing section GS converts the electrical signal of an image having R, G, and B colors which is read by the reading unit U2a, into image information of yellow Y, magenta M, cyan C, and black K for latent image formation. The image processing section GS outputs the converted image information to the writing circuit DL of the printer section U1. In addition, when the image is a single-color image, that is, a so-called monochrome image, the image processing section GS outputs only image information of black K to the writing circuit DL.

The writing circuit DL outputs a control signal corresponding to the input image information to the exposure device ROS. The exposure device ROS outputs the laser beams Ly to Lk corresponding to the control signal.

The photoconductors PRy to PRk rotate when image formation is started. A charging voltage is applied from the power circuit E to the charging rollers CRy to CRk. Accordingly, the surfaces of the photoconductors PRy to PRk are charged by the charging rollers CRy to CRk. Electrostatic latent images are formed on the surfaces of the charged photoconductors PRy to PRk by the laser beams Ly to Lk in the writing regions Q1y to Q1k. The developing devices Gy, Gm, Gc, and Gk develop electrostatic latent images of the photoconductors PRy to PRk into the toner images, which are visible images, in the development regions Q2y to Q2k.

The developed toner images are transported to the primary transfer regions Q3y, Q3m, Q3c, and Q3k that come into contact with the intermediate transfer belt B which is an example of an intermediate transfer member. In the primary transfer regions Q3y, Q3m, Q3c, and Q3k, a primary transfer voltage having a polarity opposite to the polarity of the charge of the toner is applied from the power circuit E to the primary transfer rollers T1y to T1k. Accordingly, the primary transfer rollers T1y to T1k transfer the toner images on the photoconductors PRy to PRk onto the intermediate transfer belt B. In addition, in a case of a multicolor toner image, the toner image on the downstream side is transferred to be superposed upon the toner image transferred onto the intermediate transfer belt B in the primary transfer region on the upstream side.

Photoconductor cleaners CLy to CLk clean away residual substances and attached substances on the surfaces of the photoconductors PRy to PRk which are subjected to the primary transfer. The charging rollers CRy to CRk recharge the cleaned surfaces of the photoconductors PRy to PRk.

The single-color or multicolor toner images, which are transferred onto the intermediate transfer belt B by the primary transfer rollers T1y to T1k in the primary transfer regions Q3y to Q3k, are transported to the secondary transfer region Q4.

The used pickup roller Rp of the sheet feeding trays TR1 to TR3 picks up the sheets S on which the images are printed. When plural sheets S are repeatedly picked up, the separating rollers Rs separate the sheets S, which are picked up by the pickup roller Rp, one by one. The transport rollers Ra transport the sheets S, which are separated by the separating roller Rs, through the sheet feeding path SH1. The sheets S, which are transported through the sheet feeding path SH1, are sent to the registration rollers Rr.

The registration rollers Rr transport the sheet S to the secondary transfer region Q4 at the timing for transporting the toner image, which is formed on the intermediate transfer belt B, to the secondary transfer region Q4. A secondary transfer voltage having a polarity opposite to the polarity of the charge of the toner is applied to the secondary transfer roller T2b by the power circuit E. Consequently, the toner image on the intermediate transfer belt B is transferred onto the sheet S from the intermediate transfer belt B.

The belt cleaner CLb cleans away substances attached onto the surface of the intermediate transfer belt B which is subjected to the secondary transfer.

The printing sheet S, onto which the toner image is secondarily transferred, is fixed by heat when passing through the fixing region Q5.

The printing sheet S, on which the image is fixed, is transported through the sheet discharging path SH2. The sheet discharging rollers Rh discharge the sheet S, which is transported through the sheet discharging path SH2, to the discharged sheet tray TRh.

(Description of Image Reading Device)

Figure 29:
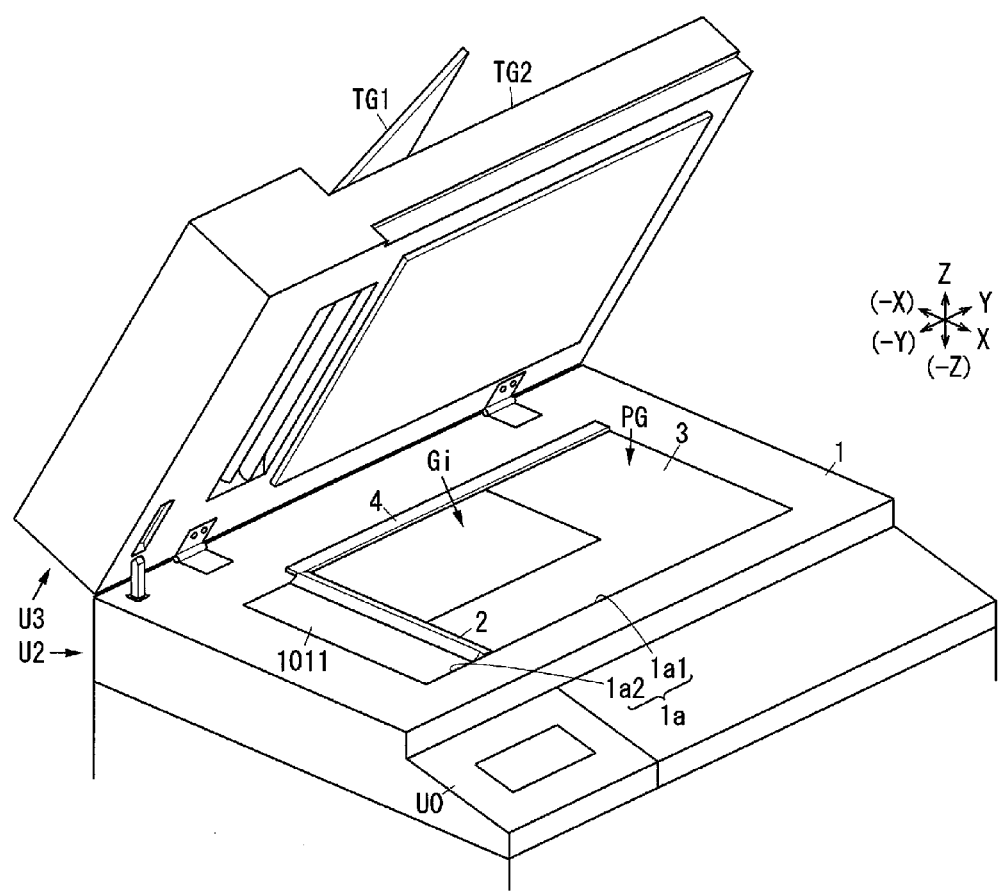
FIG. 29 is a perspective view of an opening and closing member and an image reading device of the third embodiment.

FIG. 29 is a perspective view of an opening and closing member and an image reading device of the third embodiment.

In FIG. 29, the scanner section U2, which is an example of the image reading device, has a housing 1 which is an example of a housing. A glass supporting opening 1a, which is an example of an opening, is formed on the upper surface of the housing 1. The glass supporting opening 1a is formed in a rectangular shape which is long in the left-right direction. A planar partition portion 2, which extends in the front-rear direction, is formed on the left portion of the glass supporting opening 1a. The partition portion 2 partitions the glass supporting opening 1 into a manual reading opening 1a1 on the right side and an auto-reading opening 1a2 on the left end side. Accordingly, the reading openings 1a1 and 1a2 are formed in a rectangular shape.

Figure 30:
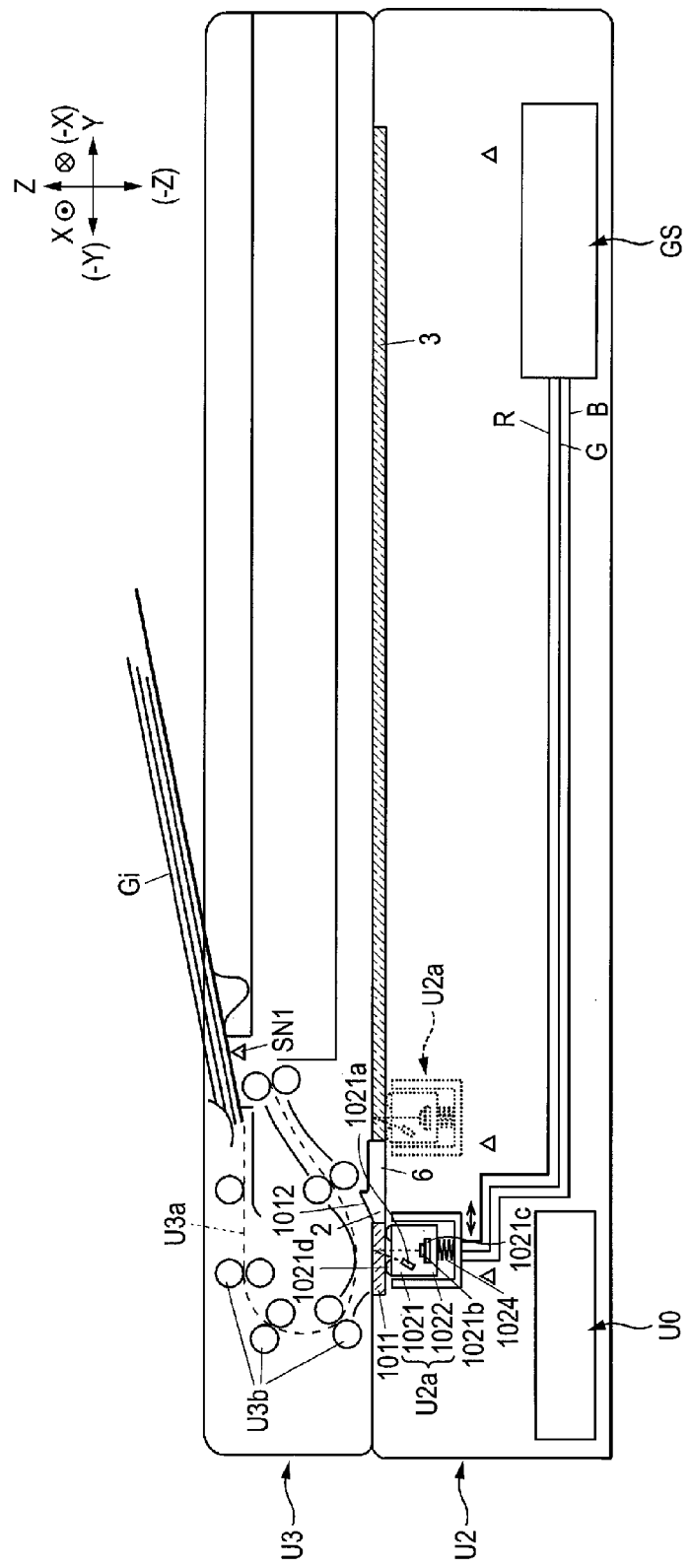
FIG. 30 is an explanatory diagram of the image reading device of the third embodiment.

FIG. 30 is an explanatory diagram of the image reading device of the third embodiment.

In FIGS. 29 and 30, the manual reading opening 1a1 supports a reading glass 3 which is an example of the first platen. The reading glass 3 of the third embodiment is formed as a glass having a transparent plate shape. The reading glass 3 supports a medium on which an image is printed, that is, the so-called original document Gi. In addition, the reading glass 3 is formed on the basis of the preset maximum size of the original document which is readable. In the third embodiment, as an example of the maximum size of the readable original document, a standard size A3 is set. That is, the reading glass 3 of the third embodiment is formed such that the size thereof in the left-right direction corresponds to the long side of the A3 size and the size thereof in the front-rear direction corresponds to the short side of the A3 size.

A rear-side alignment section 4, which has a plate shape extending in the left-right direction, is supported on the rear side of the reading glass 3. The rear-side alignment section 4 is disposed along the rear end of the reading glass 3. The rear-side alignment section 4 is disposed in a state where it has a difference in level from the upper surface of the reading glass 3 in the upward direction. Accordingly, the rear edge of the original document Gi is brought into contact with the rear-side alignment section 4, whereby it is possible to align the position of the rear end of the original document Gi. Further, a left-side alignment section 6, which has a plate shape extending in the front-rear direction, is supported on the left side of the reading glass 3, that is, the right portion of the partition portion 2. The left-side alignment section 6 is disposed along the left end of the reading glass 3. The left-side alignment section 6 is formed in a plate shape that has a difference in level from the upper surface of the reading glass 3 in the upward direction. Accordingly, the left edge of the original document Gi is brought into contact with the left-side alignment section 6, whereby it is possible to align the position of the left end of the original document Gi.

In FIGS. 29 and 30, the auto-reading opening 1a2 supports a reading glass 1011 which is an example of a second platen. The reading glass 1011 of the third embodiment is formed as a glass having a transparent plate shape. In addition, the length of the reading glass 1011 in the front-rear direction is formed on the basis of the preset maximum size of the original document which is readable. In the third embodiment, the length of the reading glass 1011 in the front-rear direction is formed to correspond to the length of the short side of the A3 size. The reading glass 3 and the reading glass 1011 constitute the platen glass PG which is an example of a supporting surface of the third embodiment.

An original document guide 1012, which is an example of a member for guiding the original document and extends in the front-rear direction, is supported on the right side of the reading glass 1011, that is, the left portion of the partition portion 2. The original document guide 1012 is formed in a shape in which the height of the left end thereof is set to be lower than the upper surface of the reading glass 1011 and which is inclined upward on the right side.

In FIGS. 27 and 30, the reading unit U2a is disposed below the platen glass PG.

The reading unit U2a includes: a contact image sensor (CIS) unit 1021 which is an example of a reading member; and a carriage 1022 which is an example of a supporting member that supports a CIS unit 1021.

The CIS unit 1021 extends in a principal scanning direction which is an example of a second direction. In addition, in the third embodiment, the principal scanning direction corresponds to the front-rear direction. A lamp 1021a, which is an example of a light source, is supported on the inside of the CIS unit 1021. The lamp 1021a irradiates the original document Gi on the upper surface of the reading glass 3 with light for reading, that is, so-called illumination light.

A light receiving portion 1021b, which reads an image by receiving the illumination light reflected by the original document Gi, is supported on the inside of the CIS unit 1021. The light, which is received by the light receiving portion 1021b, is converted into an electrical signal by a substrate 1021c, and is sent to the image processing section GS. In addition, the CIS may employ various configurations described in, for example, JP-A-2007-13309 and JP-A-2012-151568 as the related art.

Four contact portions 1021d, which protrude upward, are provided at both ends of the CIS unit 1021 of the third embodiment. The upper surface of the contact portion 1021d is formed in an arc shape, and is configured to reduce a frictional resistance even when the contact portion 1021d moves while coming into contact with the lower surface of the reading glass 3.

The CIS unit 1021 is supported to be movable in the up-down direction relative to the carriage 1022, and the CIS unit 1021 is urged upward by the springs 1024 which are examples of clamping members. Consequently, the CIS unit 1021, which is pushed by the springs 1024, is maintained in a state where the contact portions 1021d tightly press against the lower surface of the reading glass 3. That is, the distance between the original document Gi on the upper surface of the reading glass 3 and the lamp 1021a or the light receiving portion 1021b of the CIS unit 1021 is maintained at a preset spacing.

The carriage 1022 of the third embodiment is supported to be movable in the sub-scanning direction, which is an example of the first direction, by a guiding shaft which is an example of a guiding member of a unit not shown in the drawing. In addition, the carriage 1022 is connected to a belt which is an example of a moving member of a unit not shown in the drawing, and is moved in the sub-scanning direction through forward or backward rotation of the belt. Accordingly, the reading unit U2a of the third embodiment moves on the basis of detection signals of the plural sensors disposed below the platen glass PG. When reading the original document Gi which is transported by the auto-feeder U3, the reading unit U2a moves to the position indicated by the solid line of FIG. 27. When reading the original document Gi which is supported upon the upper surface of the reading glass 3, the reading unit U2a moves rightward from the reading start position indicated by the dashed line of FIG. 27.

Figure 31:
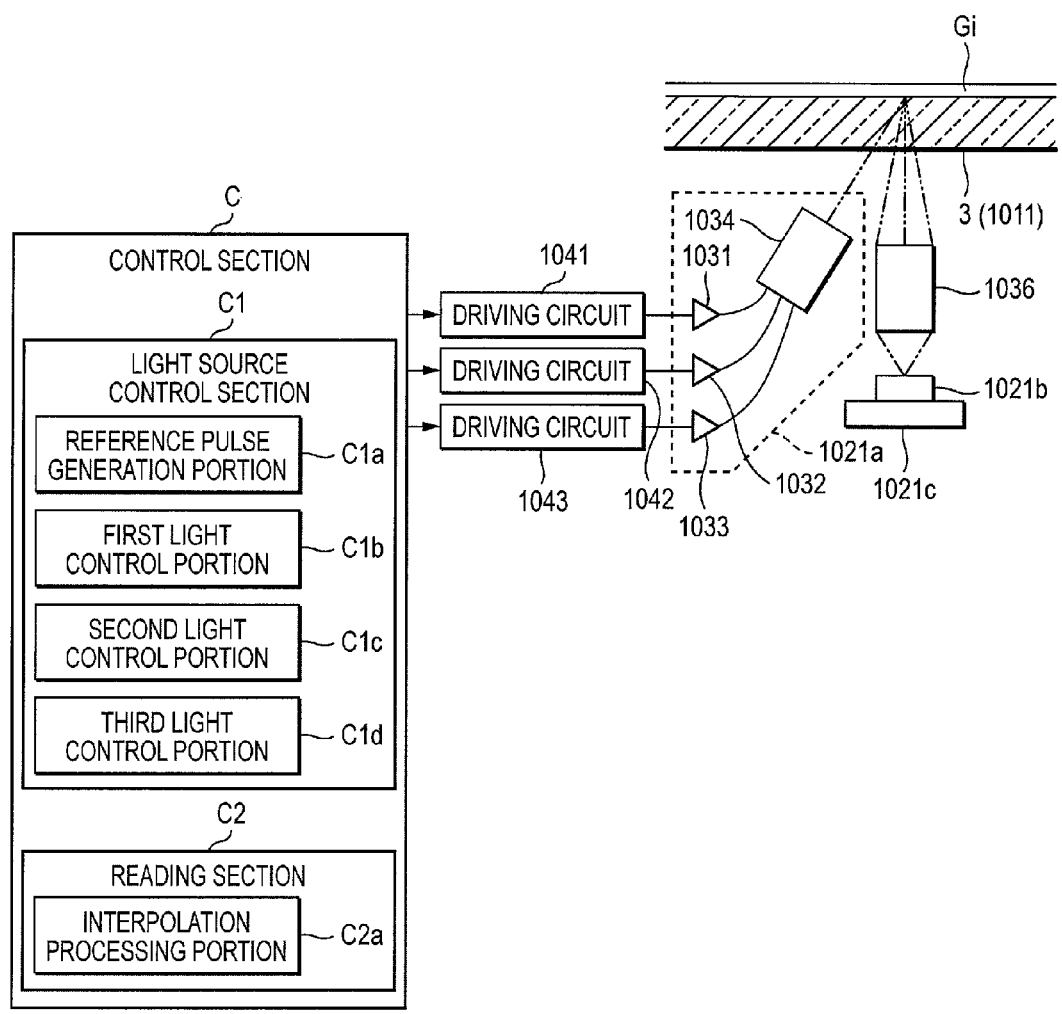
FIG. 31 is an explanatory diagram of principal sections of a light source section of the third embodiment.

FIG. 31 is an explanatory diagram of principal sections of a light source section of the third embodiment.

The lamp 1021a of the third embodiment has a red LED 1031 as an example of a first light source member, a green LED 1032 as an example of a second light source member, and a blue LED 1033 as an example of a third light source member. The red LED 1031 emits red light as an example of light with the first color. The green LED 1032 emits green light as an example of light with the second color. The blue LED 1033 emits blue light as an example of light with the third color. The light having a line shape is emitted from each of the LEDs 1031 to 1033 onto the original document Gi along the main scanning direction, through a light guide 1034 as an example of a photoconductor.

The light reflected from the original document Gi is received by a light receiving portion 1021b through a lens 1036. The light receiving portion 1021b of the third embodiment is formed of a single line sensor in which light receiving elements are arranged in a single line in the main scanning direction.

Figures 32, 33:
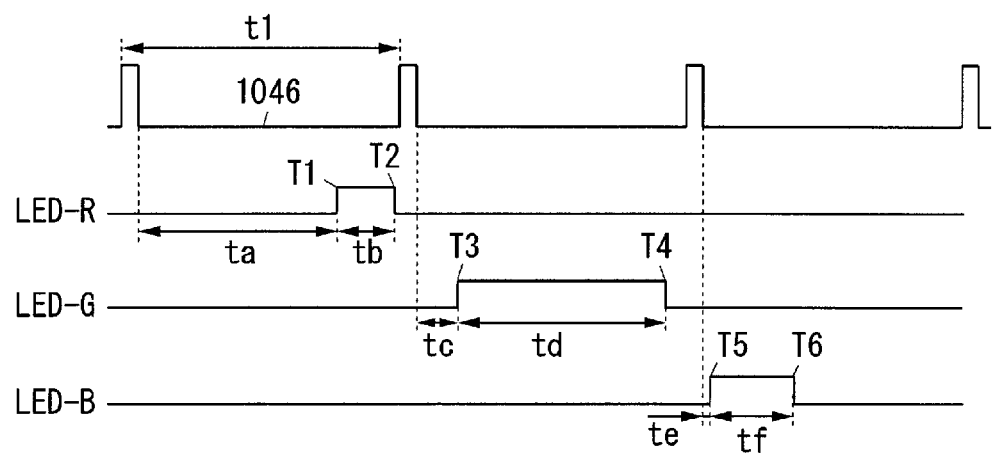
FIG. 32 is an explanatory diagram of the timing chart of light source control of the third embodiment.
FIG. 33 is an explanatory diagram of a read image correction process of the third embodiment.

FIG. 32 is an explanatory diagram of the timing chart of light source control of the third embodiment.

In FIG. 31, driving circuits 1041, 1042, and 1043 are respectively connected to the LEDs 1031 to 1033. Each of the driving circuits 1041 to 1043 is controlled by a light source control section C1 of a control section C. The light source control section C1 has a reference pulse generation portion C1a, a first light control portion C1b, a second light control portion C1c, and a third light control portion C1d as examples of reference signal generation portions. The light source control section C1 controls emission of each of the LEDs 1031 to 1033. The light source control section C1 of the third embodiment repeatedly emits light in an order of the red LED 1031, the green LED 1032, and the blue LED 1033, on the basis of a pulse signal as an example of the reference signal.

The reference pulse generation portion C1a generates a reference pulse as an example of the reference signal. In FIG. 32, the reference pulse generation portion C1a of the third embodiment generates a pulse signal 1046 as an example of the reference signal at a preset time interval t1.

The first light control portion C1b controls emission of the red light by controlling the red LED 1031 through the driving circuit 1041. When the red light is emitted, that is, when the pulse signal is generated after the blue light is previously emitted, the first light control portion C1b of the third embodiment controls the red LED 1031 at an emission start time T1 after a preset first standby time period ta has passed from the pulse signal, whereby the red light is emitted. In addition, the first standby time period ta is set to a value, which is as large as possible, on the basis of an emission time period tb of the red light and the interval t1 of the pulse such that the emission time period of the red light is as approximate as possible to the emission time period of the subsequent green light. Further, compared with the related art, the first light control portion C1b of the third embodiment increases an amount of emitted light per unit time, that is, an emission intensity, and decreases an emission time period tb. For example, in the related art, a value of current of an LED relating to an amount of light is 300 mA, and emission is performed during a time period of 50 µs, while in the third embodiment, the value of current is set to 500 mA, and the time period is set to 30 µs. Consequently, in the third embodiment, a total amount of light (=value of current×time period) received by the light receiving portion 1021b is set to be equal to that in the related art.

The second light control portion C1c controls emission of the green light by controlling the green LED 1032 through the driving circuit 1042. When the green light is emitted, that is, when the pulse signal is generated after the red light is previously emitted, the second light control portion C1c of the third embodiment controls the green LED 1032 at an emission start time T3 after a preset second standby time period tc has passed from the pulse signal, whereby the green light is emitted. In addition, the second standby time period tc is set to a value, which is as small as possible, such that the emission time period of the green light is as approximate as possible to the emission time period tb of the previous red light. Further, in the second light control portion C1c of the third embodiment, the emission time period td is set to be as long as possible in order to be approximate to the emission time period of the previous red light or the subsequent blue light. In addition, in the second light control portion C1c of the third embodiment, compared with the related art, the amount of light at the emission, that is, the value of current supplied to the LED 1032 is reduced in order for the total amount of the light received by the light receiving portion 1021b to be less than a capacity in performance of the light receiving portion 1021b, in accordance with an increase in the emission time period td.

For example, in the third embodiment, the value of current is set to 100 mA, and the emission time period td is set to 150 μs. Consequently, in the third embodiment, a total amount of light (=value of current×time period) received by the light receiving portion 1021b is set to be equal to the amount of the red light or that in the configuration of the related art. In addition, the emission time period td is set such that the middle of the time period of the green light is at the middle between the red light and the blue light. That is, in the third embodiment, the time period td of emission of the green light is set not to be biased to either a red light side or a blue light side. Accordingly, in the third embodiment, a time period from an emission end time T2 of the red light to an emission start time T3 of the green light is set to coincide with a time period from an emission end time T4 of the green light to an emission start time T5 of the blue light.

The third light control portion C1d controls emission of the blue light by controlling the blue LED 1033 through the driving circuit 1043. When the blue light is emitted, that is, when the pulse signal is generated after the green light is previously emitted, the third light control portion C1d of the third embodiment controls the blue LED 1033 at an emission start time T5 after a preset third standby time period te has passed from the pulse signal, whereby the blue light is emitted. In addition, the third standby time period te is set to a value, which is as small as possible, such that the emission start time T5 of the blue light is as approximate as possible to the emission end time T4 of the previous green light. Further, in a similar manner to the case of the red light, compared with the related art, the third light control portion C1d of the third embodiment increases an amount of light, and decreases an emission time period tf. In the third embodiment, for example, in a similar manner to the red light, the value of current of the blue light is set to 500 mA, and the emission time period tf thereof is set to 30 μs.

FIG. 33 is an explanatory diagram of a read image correction process of the third embodiment.

A reading section C2 has an interpolation processing portion C2a, and reads an image of the original document Gi, on the basis of a result of light receiving of the light receiving portion 1021b. The interpolation processing portion C2a of the reading section C2 of the third embodiment performs a correction process, which corresponds to a process of performing interpolation on misalignment of read positions, on the basis of the read R, G, and B images. In FIG. 33, in the third embodiment, for example, a red (R) image and a blue (B) image are subjected to a process of allocating 80% of the read image to a position of a green (G) image and allocating 20% thereof to a position at which the R and B images are read. It should be noted that the process is not performed on the green image.

(Functions of Image Reading Device of Third Embodiment)

In the scanner section U2 of the third embodiment having this configuration, when the image of the original document Gi is read, the image is read while the original document Gi moves relative to the reading unit U2a in the sub-scanning direction. At this time, a single column, that is, a single line of the original document Gi in the main scanning direction is irradiated sequentially with R, G, and B rays, and an image corresponding to the single line is read.

FIGS. 34A to 34F are explanatory diagrams of image reading in the related art. FIG. 34A is a timing chart of light control in the related art. FIG. 34B is an image of black lines as an example of an original document image. FIG. 34C is an explanatory diagram of respective rays in a case of reading the original document of FIG. 34B. FIG. 34D is an explanatory diagram of the read image of the original document image of FIG. 34B. FIG. 34E is an explanatory diagram of a first example of an interpolation process in the related art. FIG. 34F is an explanatory diagram of a second example of an interpolation process in the related art.

The image reading device in the related art also has a configuration in which white light is emitted and an image is read using light receiving elements of the three lines of R, G, and B, that is, a so-called three-line sensor. However, since costs of the configuration of the sensor are high, in order to reduce the costs, a single line sensor may be used. In a case of using the single line sensor in the related, as shown in FIG. 34A, the R, G, and B rays are emitted at the same timing on the basis of the pulse signal.

In such a configuration, when such a black line as shown in FIG. 34B is read, as shown in FIG. 34C, there is misalignment among the reading signals of R, G, and B. Accordingly, when those are synthesized, as shown in FIG. 34D, on a full-color read image, red and blue stripes occur on both sides of the black line in the sub-scanning direction, and so-called color mismatch occurs. In order to reduce the mismatch, before the read images of R, G, and B are synthesized, the correction process may be performed thereon.

It should be noted that the color mismatch includes color misalignment, mismatch in color blurring states, and the like. Here, for example, in order to suppress the color misalignment, it is conceivable that correction be performed. However, when an amount of misalignment from the original is large, in order to suppress the effect of the misalignment, it is conceivable that a ratio of contribution of the adjacent pixels be increased. In this case, it is necessary to change the ratio of contribution of the adjacent pixels for each color, and thus mismatch in color blurring states occurs. Further, even when the blurring states are different, new color mismatch may occur. Hereinafter, a description will be given in detail.

In FIG. 34E, an R reading value is zero at a position where the G reading is performed. Hence, a process of allocating the R reading value to the G position where the reading is not performed, that is, a so-called interpolation process may be performed. In this case, in a configuration in the related art, an R center position 1001 and a G center position 1002 become far away from each other. Hence, when all of the R reading value is allocated to the G position, if there is an image at the R position, misalignment occurs contrary to the intention, and thus it is necessary for a part of the R reading value to be allocated to the R position 1001. Consequently, a ratio of the R reading value allocatable to the G position 1002 is reduced, and then resolving power is reduced (the color is blurred). In particular, a difference in resolving power between the R reading value and the G reading value (mismatch in color blurring states) increases. Regarding the B reading value, a problem also arises in that there is a large difference in resolving power between the B reading value and the G reading value.

In the correction process shown in FIG. 34E, in order to match the R and B images with the G image, as a result, the R and B images are blurred, and there is no blurring only in the G image. In this state, as might be expected, the edge portions shown in FIG. 34D are colored. In contrast, as shown in FIG. 34F, in order to blur the G image in accordance with the R and B images, a process of also allocating the G reading value to the R and B positions 1001 and 1003 is also conceivable. However, in the process shown in FIG. 34F, the difference in resolving power is reduced, but the G resolving power is also lowered. As a result, there is a problem in that the entire resolving power is lowered (all colors are blurred).

As described in Patent Document 1, in the configuration where the emission time period is changed for each color of R, G, and B, the R, G, and B center positions 1001 to 1003 become closer than those in the case shown in FIG. 34A. However, the times of starting emission of the LEDs are fixed relative to the pulse signal, and there is limitation on reduction in the interval therebetween.

Figure 35:
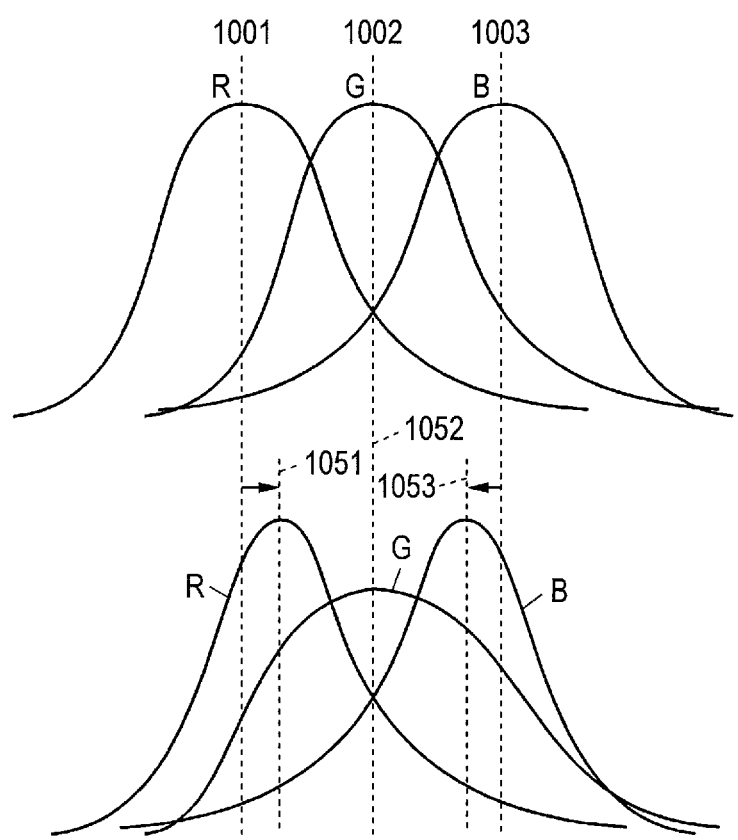
FIG. 35 is an explanatory diagram of image reading of the third embodiment, and is a diagram corresponding to FIG. 34C.

FIG. 35 is an explanatory diagram of image reading of the third embodiment, and is a diagram corresponding to FIG. 34C.

In contrast, in the third embodiment, when light is emitted in an order of R, G, and B, the times of starting emission of the R and B colors are as close as possible to that of the G color, relative to the pulse signal. Accordingly, middles 51 and 53 of the reading of the R and B colors become close to a middle 52 of the reading of the G color. Further, in the third embodiment, the amounts of emitted light of R and B colors are set to be larger than that of the G color. Accordingly, compared with the case where the amount of emitted light is equal to that in the related art, it is possible to make the R and B colors further closer to the G color. Consequently, in the third embodiment, compared with the related art, color mismatch of R, G, and B is reduced, and thus it is possible to reduce deterioration in image quality of the read image.

In particular, for example, in a similar manner to a case where the setting of reading at normally 600 dpi is changed to that at 200 dpi, when a period of reading of a single line becomes long, in a configuration in which the intervals between R, G, and B are long in the related art, there is a concern about an increase in the amount of color mismatch. In contrast, in the third embodiment, the intervals between R, G, and B are shorter than those in the related art, and it is possible to suppress the amount of color mismatch.

Further, in the third embodiment, the middle positions 51 to 53 of the R, G, and B color reading operations become close. Thus, when the interpolation process is performed on the R and B colors, compared with the related art, it is possible to increase the allocation ratios as shown in FIG. 33. Accordingly, it is possible to reduce the difference in the resolving powers between the R, G, and B colors. Further, compared with the related art, it is also possible to improve the resolving power of the whole image.

Furthermore, in the third embodiment, the emission intensity of the G color is set to be smaller than the emission intensities of the R and B colors. Accordingly, the distribution of the emission intensity of the G color shown in FIG. 35 has a shape in which the inclination of the ridge is gentle, compared with the shape of distribution of intensity of the R or B color. After the interpolation process, the ridge of the distributions of intensities of the R and B colors is gently inclined. As a result, the distributions have substantially the same shape as the distribution of the intensity of the G color. Accordingly, compared with a case where the emission intensity of the G color is not smaller than that of the R or B color, color mismatch is suppressed.

Modification Examples

Although the third embodiment of the present invention has been described above in detail, the present invention is not limited to these examples, and may be modified into various forms without departing from the scope of the present invention described in the claims. Modification Examples (H01) to (H05) of the present invention will be described below. (H01) In the embodiments, the copy machine U has been described as an example of the image forming apparatus. However, the present invention is not limited thereto, and may be applied to facsimiles or multifunction devices having multiple functions of a facsimile, a printer, a copier, and the like. Further, the present invention is not limited to an electrophotographic image forming apparatus. For example, the present invention may be applied to an image forming apparatus using an ink jet printing method or any image formation method such as a thermal head method or a lithographic printer. Furthermore, the present invention is not limited to a multicolor-development image forming apparatus, and the image forming apparatus may be also formed as a single-color, so-called monochrome, image forming apparatus. In addition, in the exemplary configuration described in the embodiments, the scanner section U2 has been described as an example of the image reading device, and, is provided in the copy machine U. However, the present invention may be applied to a configuration of a simple scanner.

(H02) In the embodiment, the emission order of the R, G, and B colors is not limited to the order of R, G, and B, and may be changed to an arbitrary order. (H03) In the embodiment, it is preferable to adopt a configuration in which the amount of emitted light of G is decreased by increasing the amounts of emitted light of R and B. However, the present invention is not limited to this. It is possible to make the amounts of emitted light of R and B equal to those in the related art or that of G. Further, it is also possible to make the amount of emitted light of G equal to that in the related art. (H04) In the embodiment, it is preferable to make the emission time periods tb and tf of R and B equal. However, the time periods may be changed depending on individual differences and characteristics such as a time period, in which the emission is stabilized, and a time lag to the emission start of the LED. It is the same for the emission time period td of G. Further, it is preferable that the emission time periods tb and tf of R and B be set to be shorter than the emission time period td of G, but the time periods may be set to be equal.

(H05) In the embodiments, the interpolation process is not limited to the exemplary processes described in the embodiments, and may be arbitrarily modified in accordance with design, specification, required image quality, and the like.

Further, it is preferable to perform the interpolation process, but it may be possible to adopt a configuration in which the interpolation process is not performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a light source section that irradiates an original document on which an image is printed, with light, the light source section including a first light source member which emits light with a first color, a second light source member which emits light with a second color different from the first color, and a third light source member which emits light with a third color different from the first and second colors;
   a reading section that reads the original document by moving in a first direction relative to the original document, the reading section having light receiving elements, which receive light reflected from the original document and are arranged to receive light along a second direction intersecting with the first direction;
   a light source control section comprising a hardware processor that controls emission of the light source members, the light source control section performing control such that light is emitted in a cycle order of the first, second, and third colors on the basis of a reference signal which is output at a time interval, and to make a time of emission of the light with the first color close to a time of start of emission of the light with the second color and to make a time of emission of the light with the third color close to a time of end of emission of the light with the second color; and
   an interpolation processing section that performs a process of interpolating the first color at a position of the second color on the basis of time deviation between the first and second colors and performs a process of interpolating the third color at the position of the second color on the basis of time deviation between the third and second colors.

2. The image reading device according to claim 1, wherein an emission time period of the light with the second color is set to be longer than an emission time period of each light with the first and third colors.

3. The image reading device according to claim 2, wherein an emission intensity of each light with the first and third colors is set to be stronger than an emission intensity of the light with the second color.

4. An image forming apparatus comprising:
   the image reading device that reads an image from an original document, according to claim 1; and
   an printing section that prints an image on a medium, on the basis of the image which is read by the image reading device.

5. A signal processing device comprising:
   an output section that outputs image information indicating images, each of which is generated for each color of a plurality of colors, together with a first synchronization signal in a cyclic color order of the plurality of colors; and
   an input/output section that, in synchronization with an input of the first synchronization signal which is output by the output section, acquires the image information corresponding to the input first synchronization signal, outputs the acquired image information to a post-stage circuit in an order of acquisition together with a second synchronization signal which is generated in response to the input of the first synchronization signal, and outputs a substitute synchronization signal substituting for the second synchronization signal to the post-stage circuit when the first synchronization signal is not input.

6. The signal processing device according to claim 5, further comprising a clock output section that generates and outputs an input clock signal for defining a time of inputting the first synchronization signal, which is output by the output section, to the input/output section,
   wherein the input/output section outputs the substitute synchronization signal to the post-stage circuit when the first synchronization signal is not input due to stop of an output of the input clock signal.

7. The signal processing device according to claim 6, wherein when causing the clock output section to restart the output of the input clock signal, the input/output section restarts the output of the input clock signal after the output of the substitute synchronization signal.

8. The signal processing device according to claim 6, wherein when generation of the input clock signal by the clock output section satisfies a condition, the input/output section causes the clock output section to restart the output of the input clock signal after the output of the substitute synchronization signal.

9. The signal processing device according to claim 5,
   wherein the output section outputs the image information, which is generated for each color of the plurality of colors, in association with color information which is determined by a corresponding color, and
   the input/output section outputs the substitute synchronization signal to the post-stage circuit when the first synchronization signal is not input, acquires the image information corresponding to the input first synchronization signal in synchronization with the input of the first synchronization signal which is output by the output section when the first synchronization signal is input again, and outputs the acquired image information from the image information, which corresponds to the color information based on a specific color of the plurality of colors, to the post-stage circuit in the color order.

10. The signal processing device according to claim 6,
    wherein the output section outputs the image information, which is generated for each color of the plurality of colors, in association with color information which is determined by a corresponding color, and
    when the first synchronization signal is not input due to stop of an output of the input clock signal, the input/output section outputs the substitute synchronization signals of which the number is determined on the basis of the color information corresponding to image information which is input finally before the stop of the output of the input clock signal, a time period as a time period until the input clock signal is output again, and a specific color specified in advance as a color corresponding to image information which is output first when the image information of the color of the plurality of colors is output again.

11. The signal processing device according to claim 9, wherein the post-stage circuit has a function of processing the image information, which is output by the input/output section, in the color order from the specific color.

12. The signal processing device according to claim 5, wherein when a plurality of the substitute synchronization signals is output, the input/output section outputs each of the substitute synchronization signals to the post-stage circuit at an interval in response to an output interval of the first synchronization signal.

13. The signal processing device according to claim 5, wherein the substitute synchronization signal is output on the basis of a output clock signal which is generated and output by a generation output source different from a generation output source which generates and outputs an input clock signal for defining the time of inputting the first synchronization signal to the input/output section.

14. An image reading device comprising:
a generation section that receives light, which is reflected when an image region including an image on a recording medium is irradiated with light for each color of a plurality of colors in a cyclic color order of the plurality of colors, so as to generate image information, which indicates the images obtained by receiving the light, in the color order; and
the signal processing device that processes the image information generated by the generation section, according to claim 5.

15. An information processing apparatus comprising:
the image reading device according to claim 14; and
an image forming apparatus that forms an image on the basis of the image information which is output to the post-stage circuit by the input/output section in the signal processing device included in the image reading device.

16. A non-transitory computer readable medium storing a program causing a computer to function as the input/output section in the signal processing device according to claim 5.

17. A signal processing device comprising:
an output section that outputs image information indicating images, each of which is generated for each color of a plurality of colors, together with synchronization signals having forms corresponding to colors in a cyclic color order of the plurality of colors; and
an input/output section that, in synchronization with inputs of the synchronization signals which are output by the output section, acquires the image information corresponding to the input synchronization signals, and outputs the acquired image information, in the color order, to a post-stage circuit from image information which corresponds to a specific synchronization signal having a form corresponding to a specific color included in the plurality of colors among the synchronization signals.

18. The signal processing device according to claim 17, wherein the input/output section outputs the acquired image information, in the color order, to the post-stage circuit from the image information corresponding to the specific synchronization signal which is input after an instruction signal for instructing the post-stage circuit to output the image information is input.

19. The signal processing device according to claim 17, wherein the synchronization signals are pulses, and
a duration of a pulse of the specific synchronization signal is longer than a duration of a pulse of a different synchronization signal.

20. The signal processing device according to claim 19, wherein the duration of the pulse is different for each corresponding color.

21. The signal processing device according to claim 17, wherein the post-stage circuit has a function of processing the image information, which is output by the input/output section, in the color order from the specific color.

22. An image reading device comprising:
a generation section that receives light, which is reflected when an image region including an image on a recording medium is irradiated with light for each color of a plurality of colors in a cyclic color order of the plurality of colors, so as to generate image information, which indicates the images obtained by receiving the light, in the color order; and
the signal processing device that processes the image information generated by the generation section, according to claim 17.

23. An information processing apparatus comprising:
the image reading device according to claim 22; and
an image forming apparatus that forms an image on the basis of the image information which is output to the post-stage circuit by the input/output section in the signal processing device included in the image reading device.

24. A non-transitory computer readable medium storing a program causing a computer to function as the input/output section in the signal processing device according to claim 17.

* * * * *